US011861120B2

(12) United States Patent
Uehara

(10) Patent No.: US 11,861,120 B2
(45) Date of Patent: Jan. 2, 2024

(54) DETECTING DEVICE AND DISPLAY DEVICE WITH TOUCH DETECTION FUNCTION

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 38 days.

(21) Appl. No.: 17/579,719

(22) Filed: Jan. 20, 2022

(65) Prior Publication Data
US 2022/0236831 A1 Jul. 28, 2022

(30) Foreign Application Priority Data

Jan. 28, 2021 (JP) ................. 2021-011881

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
CPC .... G06F 3/0446; G06F 3/0416; G06F 3/0445; G06F 3/04166
See application file for complete search history.

(56) References Cited

U.S. PATENT DOCUMENTS

| | | | | |
|---|---|---|---|---|
| 9,274,653 B2* | 3/2016 | Ishizaki | ............... | G06F 3/0446 |
| 9,760,220 B2* | 9/2017 | Tanaka | .................. | G06F 3/0445 |
| 10,289,234 B2* | 5/2019 | Mizuhashi | ............ | G06F 3/0446 |
| 10,809,846 B2* | 10/2020 | Kurasawa | ............. | G06F 3/0445 |
| 11,073,930 B2* | 7/2021 | Mizuhashi | .......... | G06F 3/04184 |
| 2011/0141040 A1* | 6/2011 | Kang | ..................... | G06F 3/0446 345/173 |
| 2013/0211757 A1 | 8/2013 | Miyamoto | | |
| 2014/0152621 A1* | 6/2014 | Okayama | ........... | G06F 3/04182 345/174 |
| 2014/0253498 A1* | 9/2014 | Suzuki | ................. | G06F 3/0445 345/174 |
| 2015/0294629 A1* | 10/2015 | Kida | ..................... | G06F 3/0446 345/87 |
| 2016/0054844 A1* | 2/2016 | Lin | ................... | G06F 3/041661 345/173 |
| 2017/0024039 A1 | 1/2017 | Miyamoto | | |
| 2017/0139526 A1* | 5/2017 | Akimoto | ............... | G06F 3/0445 |
| 2017/0212624 A1* | 7/2017 | Katsuta | ................ | G06F 3/0446 |
| 2017/0336906 A1* | 11/2017 | Yoon | ................ | G06F 3/041661 |
| 2017/0372110 A1* | 12/2017 | Uehara | .................. | G06F 3/041 |
| 2018/0224986 A1* | 8/2018 | Tanaka | ................ | G09G 3/3666 |
| 2018/0300009 A1* | 10/2018 | Kurasawa | ......... | G02F 1/134309 |
| 2018/0348935 A1* | 12/2018 | Kurasawa | ............... | G06F 3/046 |
| 2019/0102009 A1* | 4/2019 | Takada | .................. | G06F 3/0412 |
| 2019/0102020 A1* | 4/2019 | Suzuki | .................. | G06F 3/0412 |

(Continued)

FOREIGN PATENT DOCUMENTS

JP 2012-118957 A 6/2012

*Primary Examiner* — Amy Onyekaba
(74) *Attorney, Agent, or Firm* — K&L Gates LLP

(57) ABSTRACT

A detecting device includes a plurality of drive electrodes arrayed in a first direction, a plurality of detection electrodes arrayed in a second direction intersecting the first direction, a drive signal supply circuit configured to supply a drive signal to the drive electrodes, and a plurality of switch elements configured to switch between coupling and decoupling between the drive electrodes.

20 Claims, 21 Drawing Sheets

(56) References Cited

U.S. PATENT DOCUMENTS

2019/0146619 A1* 5/2019 Kurasawa ........... G02F 1/13338
                                                    345/173
2019/0235299 A1* 8/2019 Imazeki .............. G02F 1/13338
2019/0302967 A1* 10/2019 Kurasawa ............. G06F 3/0412
2021/0405847 A1* 12/2021 Choi .................... G06F 3/0446

* cited by examiner

FIG.16
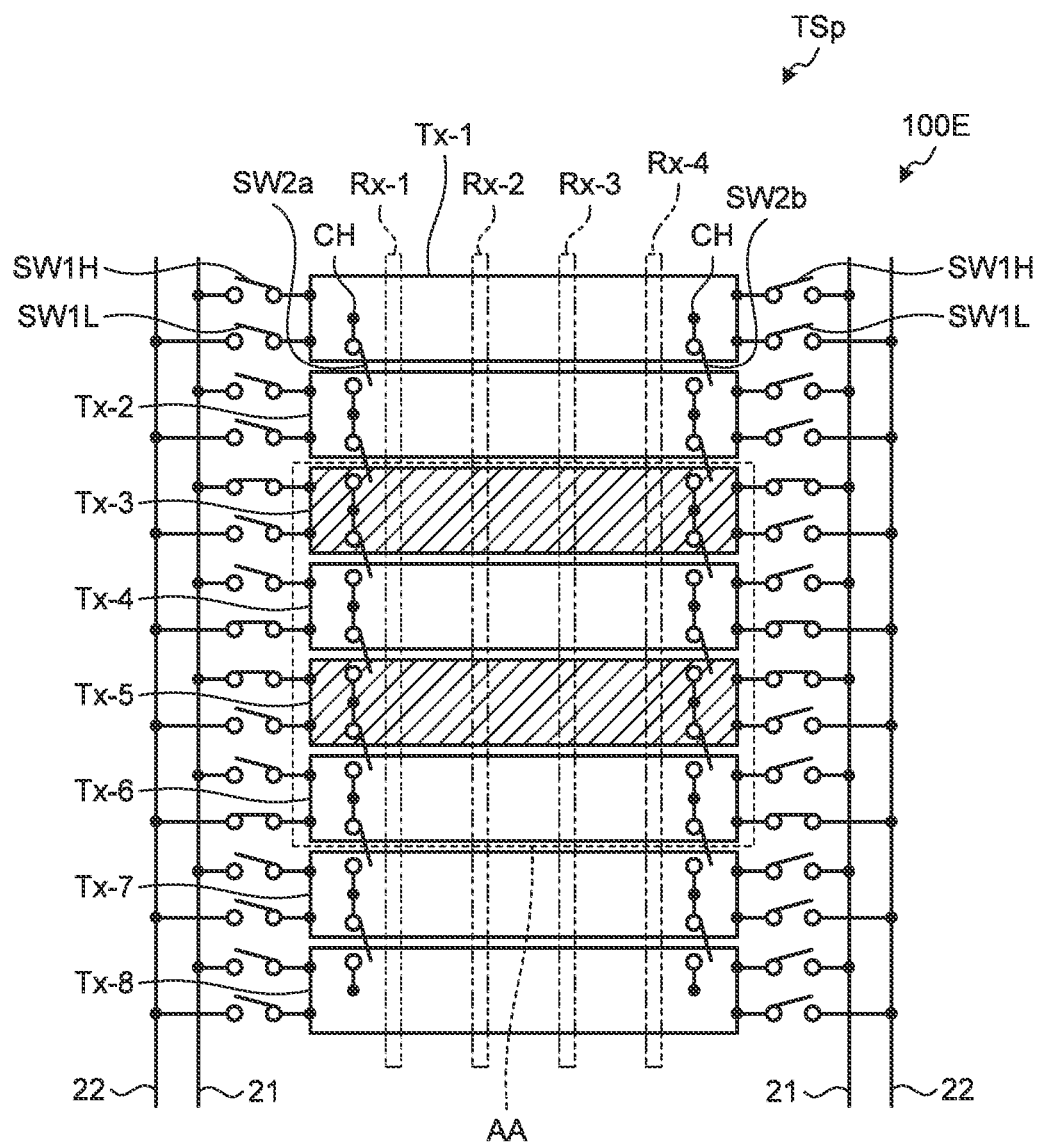
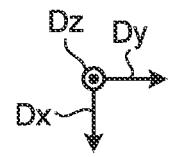

DETECTING DEVICE AND DISPLAY DEVICE WITH TOUCH DETECTION FUNCTION

CROSS-REFERENCE TO RELATED APPLICATION

This application claims the benefit of priority from Japanese Patent Application No. 2021-011881 filed on Jan. 28, 2021, the entire contents of which are incorporated herein by reference.

BACKGROUND

1. Technical Field

The present disclosure relates to a detecting device and a display device with a touch detection function.

2. Description of the Related Art

There have recently been demands for achieving a fingerprint detection used for personal authentication, for example, by a capacitive system. To detect a fingerprint, electrodes having a smaller area are used than in detecting contact of a hand or a finger. If signals are acquired from small electrodes, code division multiplexing drive can achieve satisfactory detection sensitivity. The code division multiplexing drive is a drive system that simultaneously selects a plurality of drive electrodes and supplies drive signals the phase of which is determined based on a predetermined code to the selected drive electrodes (refer to Japanese Patent Application Laid-open Publication No. 2012-118957 A).

Detecting devices that perform the code division multiplexing drive may possibly have larger power consumption than detecting devices that sequentially drive a plurality of drive electrodes in a time-division manner.

An object of the present disclosure is to provide a detecting device that can reduce power consumption.

SUMMARY

A detecting device according to an embodiment of the present disclosure includes a plurality of drive electrodes arrayed in a first direction, a plurality of detection electrodes arrayed in a second direction intersecting the first direction, a drive signal supply circuit configured to supply a drive signal to the drive electrodes, and a plurality of switch elements configured to switch between coupling and decoupling between the drive electrodes. The drive electrodes include at least a first drive electrode and a second drive electrode disposed side by side in the first direction, the drive signal supply circuit supplies a first voltage signal to one of the first drive electrode and the second drive electrode and supplies a second voltage signal having an electric potential different from an electric potential of the first voltage signal to another one of the first drive electrode and the second drive electrode, and the switch elements switch between coupling and decoupling of at least the first drive electrode and the second drive electrode.

BRIEF DESCRIPTION OF THE DRAWINGS

FIG. 16 is a diagram for explaining a coupling configuration of a plurality of drive electrodes according to a fourth embodiment in a first period;

DETAILED DESCRIPTION

Figure 1:
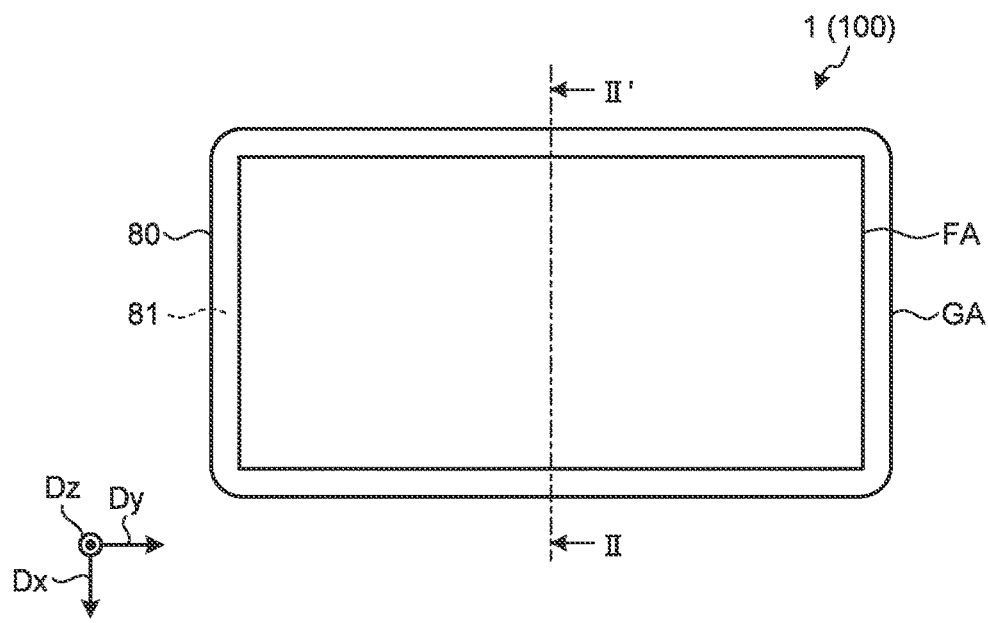
FIG. 1 is a plan view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be appropriately omitted.

To describe an aspect where a first structure is disposed on a second structure in the present specification and the claims, the term "on" includes both of the following cases unless otherwise noted: a case where the first structure is disposed directly on the second structure in contact with the second structure, and a case where the first structure is disposed on the second structure with another structure interposed therebetween.

First Embodiment

Figure 2:
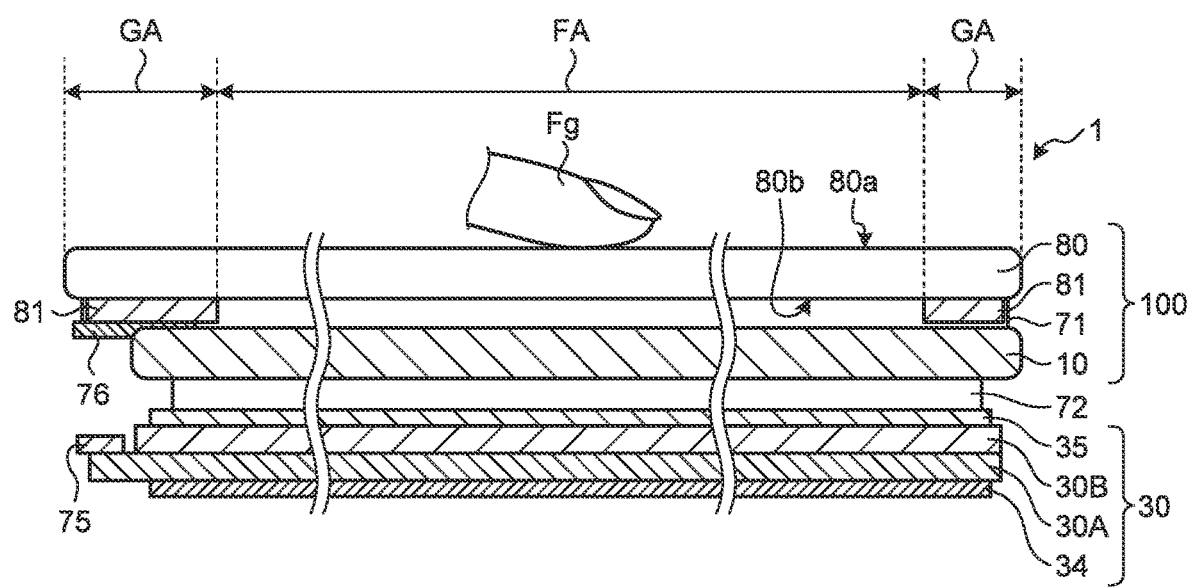
FIG. 2 is a sectional view along line II-II' of FIG. 1.

FIG. 1 is a plan view of a display device according to a first embodiment. FIG. 2 is a sectional view along line II-II' of FIG. 1. As illustrated in FIGS. 1 and 2, a display device 1 according to the present embodiment has a detection region FA and a frame region GA provided outside the detection region FA. The detection region FA is a region for detecting recesses and protrusions on the surface of an object to be detected, such as a finger Fg, in contact with or in proximity to a cover member 80. In the display device 1 according to the present embodiment, a display region of a display panel 30 is identical or substantially identical with the detection region FA of a detecting device 100. As a result, the display device 1 can detect a fingerprint on the whole display region. The shape of the display region and the detection region FA is a rectangle, for example.

As illustrated in FIG. 2, the display device 1 includes the display panel 30 and the detecting device 100. The detecting device 100 includes a sensor 10 and the cover member 80. The cover member 80 is a plate-like member having a first surface 80a and a second surface 80b opposite to the first surface 80a. The first surface 80a of the cover member 80 serves not only as a detection surface for detecting recesses and protrusions on the surface of the finger Fg or the like in contact with or in proximity to the cover member 80 but also as a display surface on which an observer visually recognizes an image on the display panel 30. The sensor 10 and the display panel 30 are provided on the second surface 80b of the cover member 80. The cover member 80 is a member for protecting the sensor 10 and the display panel 30, and covers the sensor 10 and the display panel 30. The cover member 80 is a glass or resin substrate, for example.

The cover member 80, the sensor 10, and the display panel 30 are not limited to the configuration having a rectangular shape in planar view and may have other shapes, such as circular and elliptic shapes and an irregular shape obtained by removing part of these outer shapes. The cover member 80 is not limited to a plate shape. If the display region and the detection region FA have a curved surface, or if the frame region GA has a curved surface curved toward the display panel 30, for example, the cover member 80 may have a curved surface. In this case, the display device 1 is a curved surface display with a fingerprint detection function and can detect a fingerprint on the curved surface of the curved surface display. The detecting device 100 is not limited to the configuration of being stacked on the display panel 30 and may be configured as a single fingerprint detecting device without providing the display panel 30, which will be described later.

In the present specification, "planar view" refers to a positional relation viewed from a direction perpendicular to a first surface 101a of a substrate 101 illustrated in FIG. 3, which will be described later. The direction perpendicular to the first surface 101a is the "normal direction (third direction Dz) of the substrate 101".

As illustrated in FIGS. 1 and 2, the second surface 80b of the cover member 80 is provided with a decorative layer 81 in the frame region GA. The decorative layer 81 is a colored layer having light transmittance lower than that of the cover member 80. The decorative layer 81 can prevent wiring, circuits, and other components provided overlapping the frame region GA from being visually recognized by the observer. While the decorative layer 81 is provided on the second surface 80b in the example illustrated in FIG. 2, it may be provided on the first surface 80a. The decorative layer 81 is not limited to a single layer and may be composed of a plurality of layers.

The sensor 10 is a detector for detecting recesses and protrusions on the surface of the finger Fg or the like in contact with or in proximity to the first surface 80a of the cover member 80. As illustrated in FIG. 2, the sensor 10 is provided between the cover member 80 and the display panel 30. The sensor 10 overlaps the detection region FA and part of the frame region GA when viewed from a direction perpendicular to the first surface 80a (normal direction). The sensor 10 is coupled to a wiring substrate 76 in the frame region GA. The wiring substrate 76 is provided with a detection IC (not illustrated) for controlling detection operations of the sensor 10. The wiring substrate 76 is a flexible printed circuit board, for example.

A first surface of the sensor 10 is bonded to the second surface 80b of the cover member 80 with an adhesive layer 71 interposed therebetween. A second surface of the sensor 10 is bonded to a polarizing plate 35 of the display panel 30 with an adhesive layer 72 interposed therebetween. The adhesive layers 71 and 72 are made of translucent adhesive or resin and allow visible light to pass therethrough.

The display panel 30 includes a pixel substrate 30A, a counter substrate 30B, a polarizing plate 34, and the polarizing plate 35. The polarizing plate 34 is provided under the pixel substrate 30A. The polarizing plate 35 is provided on the counter substrate 30B. The pixel substrate 30A is coupled to a display IC (not illustrated) for controlling display operations of the display panel 30 through a wiring substrate 75. The display panel 30 according to the present embodiment is a liquid crystal panel including liquid crystal display elements serving as a display functional layer. The display panel 30 is not limited thereto and may be an organic light-emitting diode (OLED) display panel including OLEDs as electro luminescence (EL) elements for display elements or a display panel including electrophoretic elements for display elements, for example.

The detection IC and the display IC described above may be provided to a control substrate outside the module. Alternatively, the detection IC may be provided to the substrate 101 (refer to FIG. 3) of the sensor 10. The display IC may be provided to the pixel substrate 30A.

The following describes the configuration of the detecting device 100 in greater detail. FIG. 3 is a plan view illustrating an example of the configuration of the detecting device according to the first embodiment. As illustrated in FIG. 3, the detecting device 100 includes the substrate 101 and the sensor 10 provided on the first surface 101a of the substrate 101. The sensor 10 includes a plurality of drive electrodes Tx and a plurality of detection electrodes Rx. The substrate 101 is a translucent glass substrate that can allow visible light to pass therethrough. The substrate 101 may be a translucent resin substrate or resin film made of resin, such as polyimide. The sensor 10 is a translucent sensor.

The drive electrodes Tx and the detection electrodes Rx are provided in the detection region FA. The drive electrodes Tx are disposed side by side in a first direction Dx. The drive electrodes Tx extend in the second direction Dy. The detection electrodes Rx are disposed side by side in the second direction Dy. The detection electrodes Rx extend in the first direction Dx. As described above, the detection electrodes Rx extend in a direction intersecting the extending direction of the drive electrodes Tx. Each detection electrode Rx is coupled to the wiring substrate 76 provided in the frame region GA of the substrate 101 through frame wiring (not illustrated) and a detection electrode selection circuit 14. The wiring substrate 76 is coupled to a side of the substrate 101 provided with the detection electrode selection circuits 14.

The first direction Dx is one direction in a plane parallel to the substrate 101 and is a direction parallel to one side of the detection region FR, for example. The second direction Dy is one direction in the plane parallel to the substrate 101 and is a direction orthogonal to the first direction Dx. The second direction Dy may intersect the first direction Dx without being orthogonal thereto. The third direction Dz is a direction orthogonal to the first direction Dx and the second direction Dy, and is a direction vertical to the first surface 101a of the substrate 101.

The drive electrode Tx is formed in a rectangular shape, and the detection electrode Rx is formed in a zigzag-line shape. The configuration is not limited thereto, and the shape and the arrangement pitch of the drive electrodes Tx and the detection electrodes Rx can be appropriately changed. The drive electrodes Tx are made of translucent conductive material, such as indium tin oxide (ITO). The detection electrodes Rx are made of metal material, such as aluminum or an aluminum alloy. Alternatively, the drive electrodes Tx may be made of metal material, and the detection electrodes Rx may be formed by ITO. The drive electrodes Tx and the detection electrodes Rx may be made of the same material. An insulating layer (not illustrated) is interposed between the drive electrodes Tx and the detection electrodes Rx.

Capacitance is formed at the intersections of the detection electrodes Rx and the drive electrodes Tx. The sensor 10 performs touch detection and fingerprint detection based on a change in capacitance between the detection electrodes Rx and the drive electrodes Tx. The sensor 10 performs, by code division multiplexing drive (hereinafter, referred to as CDM drive), a fingerprint detection operation by a mutual capacitive system. Specifically, a drive electrode selection circuit 15 simultaneously selects a plurality of drive electrodes Tx. The drive electrode selection circuit 15 supplies drive signals VTP the phase of which is determined based on a predetermined code to the selected drive electrodes Tx. The detection electrodes Rx output detection signals Vdet corresponding to a change in capacitance due to the recesses and protrusions on the surface of a finger or the like in contact with or in proximity to the sensor 10. As a result, the sensor 10 performs fingerprint detection.

When the drive electrode selection circuit 15 performs touch detection, it may perform touch detection by sequentially driving a plurality of drive electrodes Tx in a time-division manner or sequentially selecting and driving each drive electrode block including a plurality of drive electrodes Tx.

Figure 3:
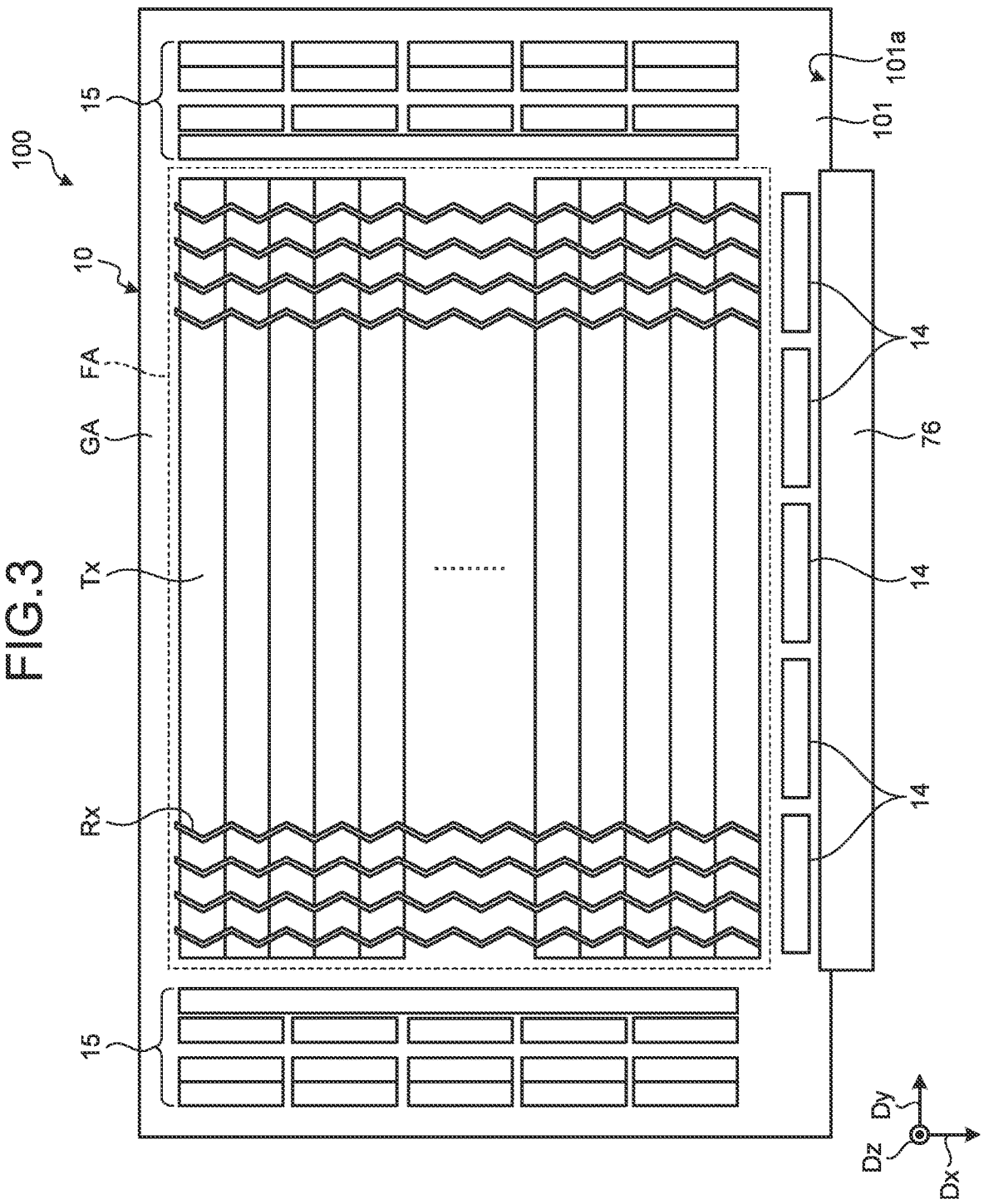
FIG. 3 is a plan view illustrating an example of the configuration of a detecting device according to the first embodiment.

While various circuits, such as the detection electrode selection circuits 14 and the drive electrode selection circuits 15, are provided in the frame region GA of the substrate 101 in FIG. 3, this configuration is given by way of example only. At least part of the various circuits may be included in the detection IC mounted on the wiring substrate 76.

Figure 4:
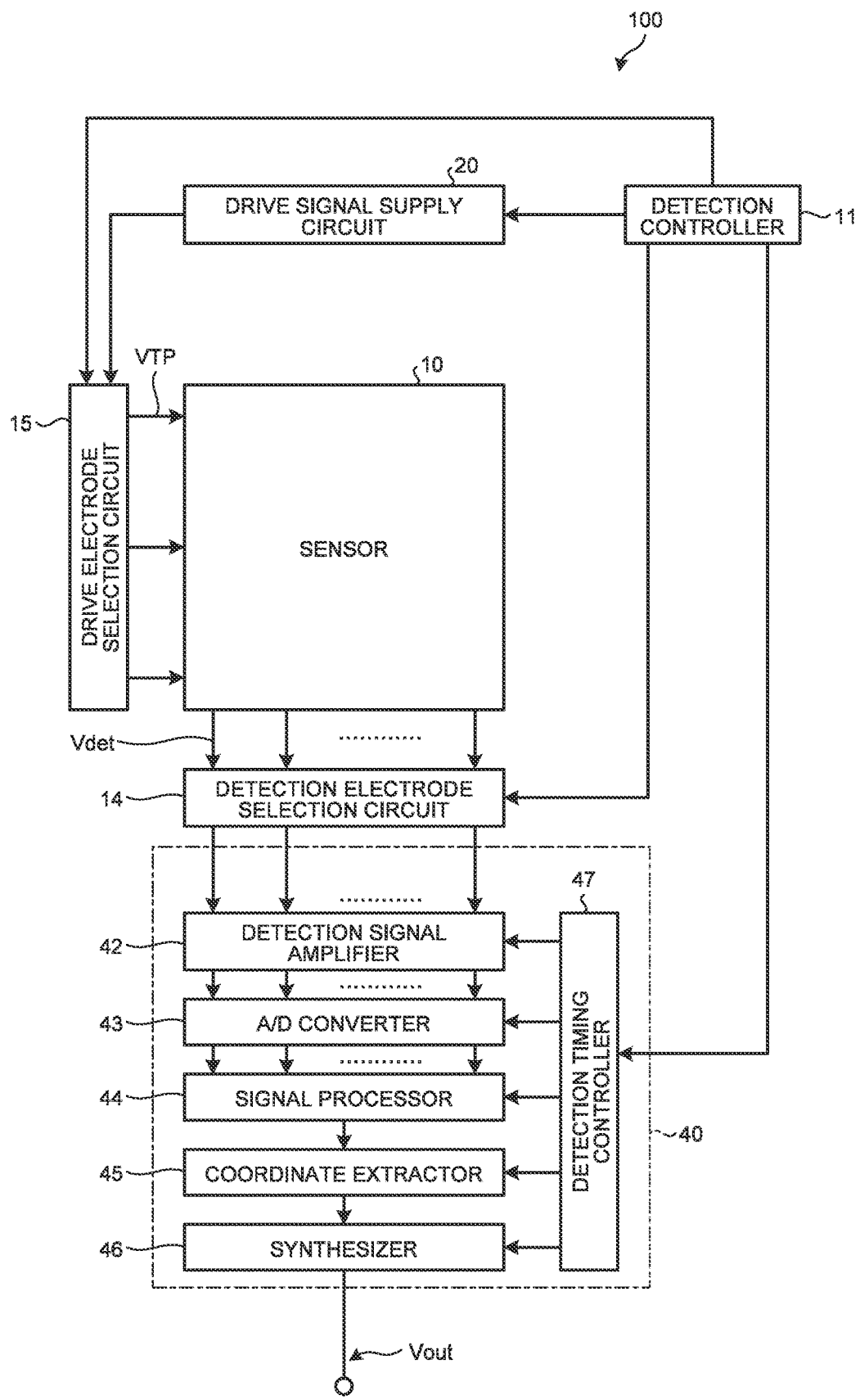
FIG. 4 is a block diagram illustrating an example of the configuration of the detecting device according to the first embodiment.

FIG. 4 is a block diagram illustrating an example of the configuration of the detecting device according to the first embodiment. As illustrated in FIG. 4, the detecting device 100 includes the sensor 10, a detection controller 11, the drive electrode selection circuit 15, a detection electrode selection circuit 14, and a detection circuit 40.

The detection controller 11 is a circuit that controls detection operations of the sensor 10. The drive electrode selection circuit 15 is a circuit that supplies the drive signals VTP for detection to the drive electrodes Tx of the sensor 10 based on control signals supplied from the detection controller 11. The detection electrode selection circuit 14 selects the detection electrodes Rx of the sensor 10 and couples them to the detection circuit 40 based on control signals supplied from the detection controller 11.

The detection circuit 40 is a circuit that detects the shape of a fingerprint by detecting the recesses and protrusions on the surface of a finger or the like in contact with or in proximity to the first surface 80a of the cover member 80 based on the control signals supplied from the detection controller 11 and the detection signals Vdet output from the detection electrodes Rx. The detection circuit 40 includes a detection signal amplifier 42, an A/D converter 43, a signal processor 44, a coordinate extractor 45, a synthesizer 46, and a detection timing controller 47. The detection timing controller 47 controls the detection signal amplifier 42, the A/D converter 43, the signal processor 44, the coordinate extractor 45, and the synthesizer 46 such that they operate synchronously with one another based on the control signals supplied from the detection controller 11.

The detection signals Vdet are supplied from the sensor 10 to the detection signal amplifier 42 of the detection circuit 40. The detection signal amplifier 42 amplifies the detection signals Vdet. The A/D converter 43 converts analog signals output from the detection signal amplifier 42 into digital signals.

The signal processor 44 is a logic circuit that detects whether a finger is in contact with or in proximity to the sensor 10 based on the output signals from the A/D converter 43. The signal processor 44 performs processing of extracting a signal (absolute value $|\Delta V|$) of the difference between the detection signals due to the finger. The signal processor 44 compares the absolute value $|\Delta V|$ with a predetermined threshold voltage. If the absolute value $|\Delta V|$ is lower than the threshold voltage, the signal processor 44 determines that the object to be detected is in a non-contact state or is sufficiently far away from the detection position to determine that it is in a non-contact state. By contrast, if the absolute value $|\Delta V|$ is equal to or higher than the threshold voltage, the signal processor 44 determines that the object to be detected is in a contact state or is in sufficiently proximity to the detection position to determine that it is substantially in a contact state. As described above, the detection circuit 40 can detect contact or proximity of the object to be detected.

More specifically, the signal processor 44 calculates a plurality of detection signals Vdet supplied from the sensor 10 based on a predetermined code, and performs decoding on the calculated detection signals Vdet based on the predetermined code in CDM drive. An example of the operations in CDM drive will be described later in greater detail.

The coordinate extractor 45 is a logic circuit that calculates, when the signal processor 44 detects contact or proximity of a finger, the detection coordinates of the finger. The coordinate extractor 45 outputs the detection coordinates to the synthesizer 46. The synthesizer 46 combines the detection signals Vdet output from the sensor 10, thereby generating two-dimensional information indicating the object to be detected in contact with or in proximity to the sensor 10. The synthesizer 46 outputs the two-dimensional information as output Vout from the detection circuit 40. Alternatively, the synthesizer 46 may generate an image based on the two-dimensional information and output the image information as the output Vout.

The detection IC described above functions as the detection circuit 40 illustrated in FIG. 4. Part of the functions of the detection circuit 40 may be included in the display IC described above or be provided as functions of an external micro-processing unit (MPU).

Figure 5:
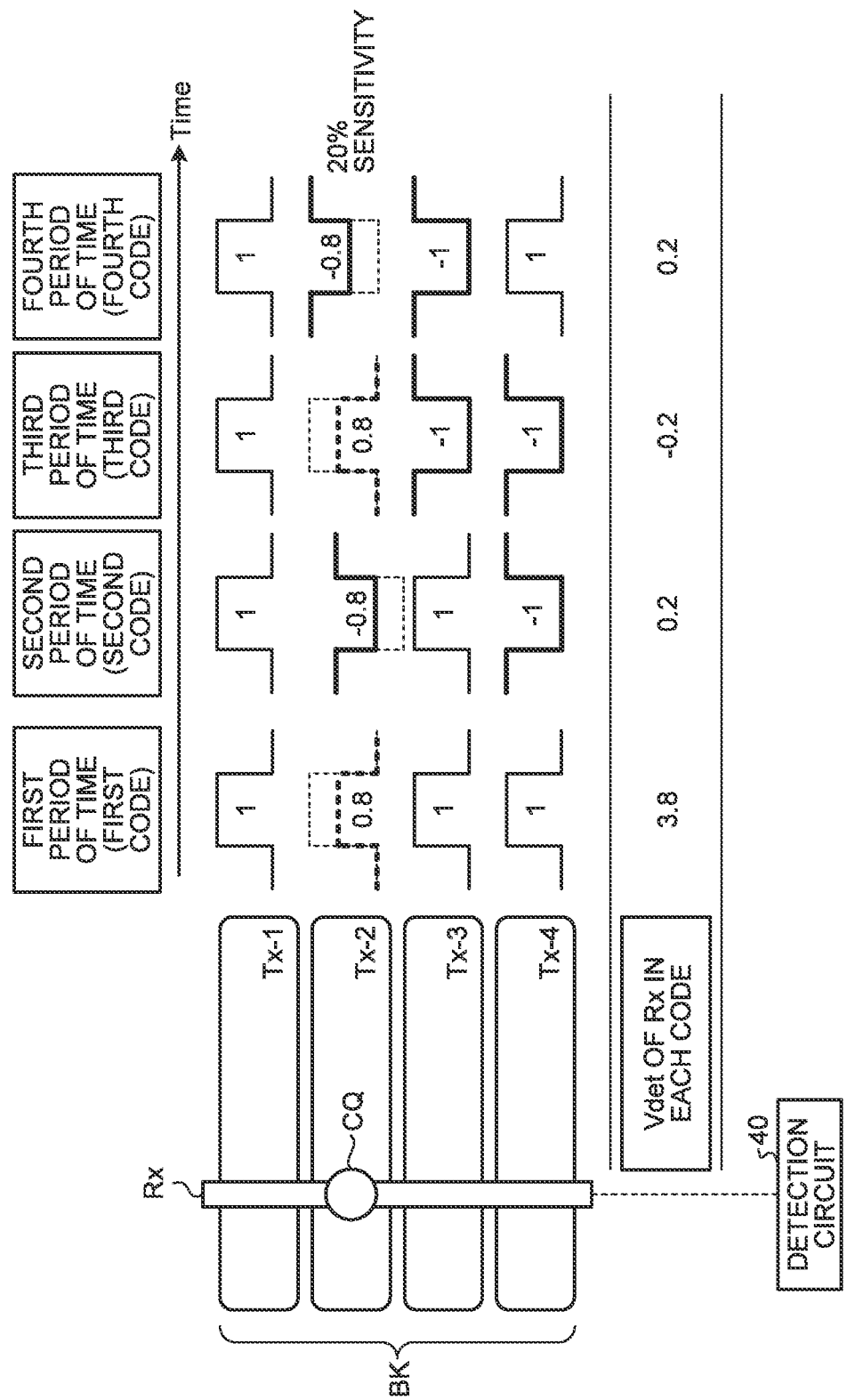
FIG. 5 is a diagram for explaining an example of an operation in code division multiplexing drive.

The following describes CDM drive performed by the detecting device 100. FIG. 5 is a diagram for explaining an example of an operation in code division multiplexing drive. To simplify the explanation, FIG. 5 illustrates an example of the operation in CDM drive performed on four drive electrodes Tx-1, Tx-2, Tx-3, and Tx-4.

As illustrated in FIG. 5, the drive electrode selection circuit 15 (refer to FIG. 4) simultaneously selects four drive electrodes Tx-1, Tx-2, Tx-3, and Tx-4 of a drive electrode block BK. The drive electrode selection circuit 15 supplies the drive signals VTP the phase of which is determined based on a predetermined code to the drive electrodes Tx.

The predetermined code is defined by a square matrix H in Expression (1), for example. The order of the square matrix H is four, which is equal to the number of drive electrodes Tx-1, Tx-2, Tx-3, and Tx-4. The predetermined code is based on the square matrix H the elements of which are either "1" or "−1" or either "1" or "0" and two desired different rows of which are an orthogonal matrix. The predetermined code is based on a Hadamard matrix, for example. The drive electrode selection circuit 15 applies the drive signals VTP such that the phase of AC rectangular waves corresponding to the element "1" is opposite to the phase of AC rectangular waves corresponding to the element "−1" based on the square matrix H in Expression (1). In other words, the element "−1" of the square matrix H in Expression (1) is an element for supplying the drive signal VTP determined to have a phase different from that of the element "1".

$$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (1)$$

FIG. 5 illustrates a case where an external proximity object CQ, such as the finger Fg, is present on a portion at which the drive electrode Tx-2 out of the drive electrodes Tx-1, Tx-2, Tx-3, and Tx-4 intersects the detection electrode Rx, for example. A voltage of difference due to the external proximity object CQ is generated (the voltage of difference is 20%, for example) by mutual induction at the intersection portion of the drive electrode Tx-2 and the detection electrode Rx to which the external proximity object CQ is in proximity. In the example illustrated in FIG. 5, a signal obtained by integrating the detection signal corresponding to the element "1" and the detection signal corresponding to the element "−1" is output as the detection signal Vdet from the detection electrode Rx.

In a first period of time, the drive electrode selection circuit 15 supplies positive-polarity drive signals VTP to the drive electrodes Tx-1, Tx-2, Tx-3, and Tx-4 corresponding to the elements (1,1,1,1) in the first row of the square matrix H (first code). The detection signal Vdet output from the detection electrode Rx and detected by the detection circuit 40 in the first period of time is calculated by: (1)+(0.8)+(1)+(1)=3.8.

In a second period of time, the drive electrode selection circuit 15 supplies positive-polarity drive signals VTP to the drive electrodes Tx-1 and Tx-3 and supplies negative-polarity drive signals VTP to the drive electrodes Tx-2 and Tx-4 corresponding to the elements (1,−1,1,−1) in the second row of the square matrix H (second code). The detection signal Vdet output from the detection electrode Rx and detected by the detection circuit 40 in the second period of time is calculated by: (1)+(−0.8)+(1)+(−1)=0.2.

Similarly, the detection signal Vdet in a third period of time (third code) is calculated by: (1)+(0.8)+(−1)+(−1)=−0.2. The detection signal Vdet in a fourth period of time (fourth code) is calculated by: (1)+(−0.8)+(−1)+(1)=0.2.

The signal processor 44 multiplies the detection signals Vdet (Vdet=(3.8,0.2,−0.2,0.2)) output from the detection electrode Rx and detected in each period of time by the square matrix H in Expression (1), thereby performing decoding. As a result, the signal processor 44 derives "4.0, 3.2, 4.0, 4.0" as a decoded signal. The detection circuit 40 can detect that the external proximity object CQ, such as the finger Fg, is in contact with the position of the drive electrode Tx-2 in the relation with the detection electrode Rx based on the decoded signal. As described above, the detecting device 100 can detect whether the external proximity of object CQ is in contact with the intersections of the drive electrodes Tx and the detection electrodes Rx. By making the pitch between the intersections of the drive electrodes Tx and the detection electrodes Rx as small as possible, the detecting device 100 can detect the recesses and protrusions (e.g., a fingerprint) on the surface of the external proximity object CQ. The coordinate extractor 45 outputs the touch panel coordinates or the decoded signal as the output Vout.

While FIG. 5 illustrates the example of the operation in CDM drive performed on four drive electrodes Tx, CDM drive may be performed on five or more drive electrodes Tx. In this case, the predetermined code is defined by a square matrix the order of which corresponds to the number of drive electrodes Tx. The order of the matrix included in the predetermined code is not necessarily equal to the number of drive electrodes Tx included in one drive electrode block BK.

Figure 6:
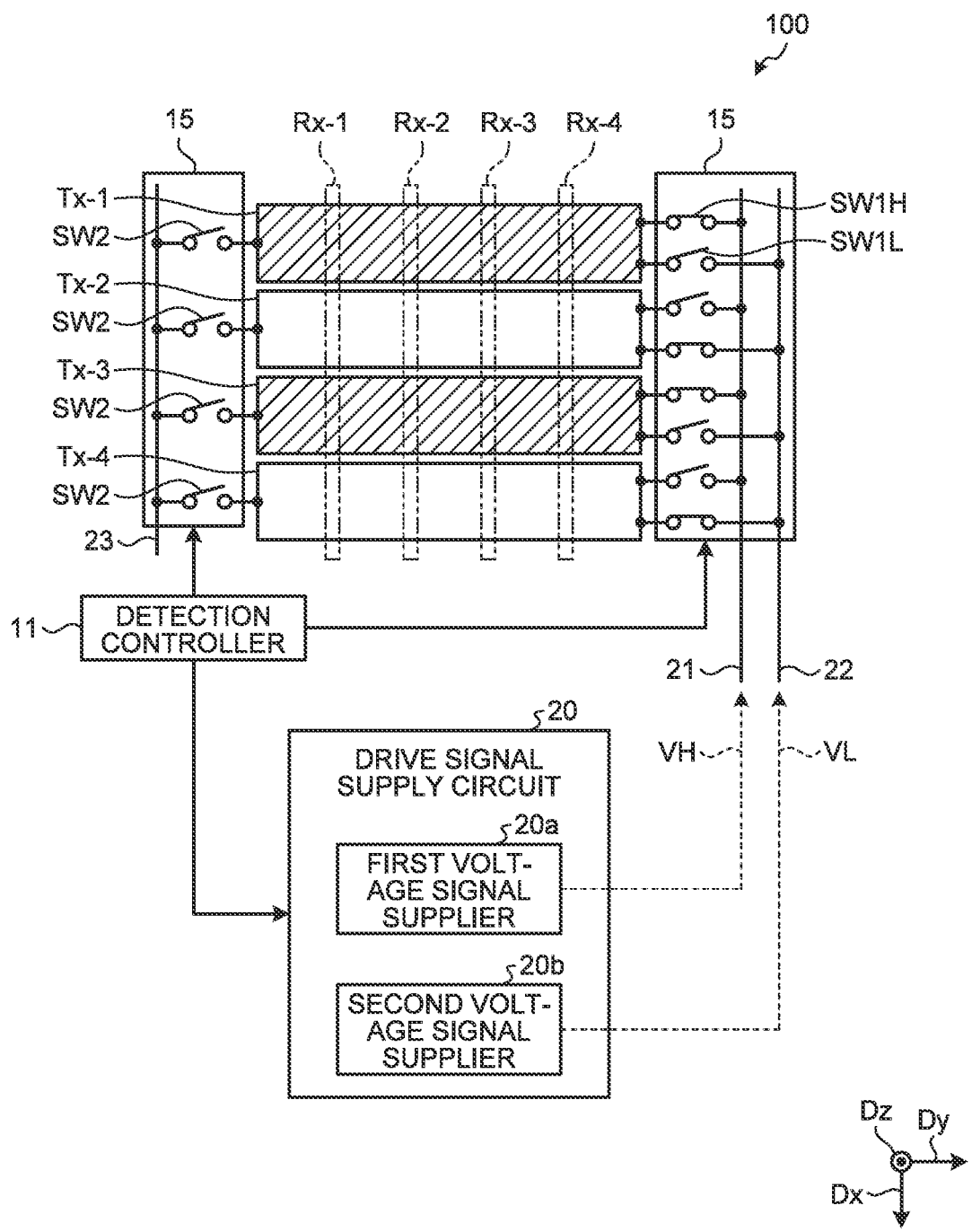
FIG. 6 is a diagram for explaining a coupling configuration of a plurality of drive electrodes.

FIG. 6 is a diagram for explaining a coupling configuration of a plurality of drive electrodes. To simplify the explanation, FIG. 6 illustrates four drive electrodes Tx-1, Tx-2, Tx-3, and Tx-4 and four detection electrodes Rx-1, Rx-2, Rx-3, and Rx-4.

As illustrated in FIG. 6, the detecting device 100 further includes a drive signal supply circuit 20, first switch elements SW1H and SW1L, second switch elements SW2, and wiring 21, 22, and 23. The drive signal supply circuit 20 is a circuit that supplies the drive signals VTP to the drive electrodes Tx. The drive signal supply circuit 20 may be included in the detection IC described above or be provided on the substrate 101.

The drive signal supply circuit 20 includes a first voltage signal supplier 20a and a second voltage signal supplier 20b. The first voltage signal supplier 20a is a circuit that supplies the drive electrodes Tx with first voltage signals VH having positive polarity corresponding to the element "1" of the square matrix H. The second voltage signal supplier 20b is a circuit that supplies the drive electrodes Tx with second voltage signals VL having negative polarity corresponding to the element "−1" of the square matrix H. The first voltage signal VH and the second voltage signal VL are voltage signals having different electric potentials. The first voltage signal VH and the second voltage signal VL are alternately repeated corresponding to the predetermined code, thereby forming the drive signal VTP.

The first switch elements SW1H and SW1L and the second switch elements SW2 are included in the drive electrode selection circuit 15 (refer to FIG. 4). The second switch elements SW2 and the wiring 23 are disposed at a first end of the drive electrodes Tx in the extending direction (second direction Dy). The first switch elements SW1H and SW1L and the wiring 21 and 22 are disposed at a second end of the drive electrodes Tx in the extending direction (second direction Dy). In the following description, the first end of the drive electrodes Tx in the extending direction (second direction Dy) is referred to as the "left end", and the second end is referred to as the "right end" with reference to FIG. 6 and other drawings. The first switch elements SW1H and SW1L may be simply referred to as the first switch elements SW1 when they need not be distinguished from each other.

First ends of the first switch elements SW1H and SW1L are coupled to the right end of one corresponding drive electrode Tx. A second end of each first switch element SW1H is coupled to the wiring 21. A second end of each first switch element SW1L is coupled to the wiring 22. When the first switch element SW1H is turned on (coupled state), the drive signal supply circuit 20 supplies the first voltage signals VH to the drive electrode Tx (drive electrodes Tx-1 and Tx-3 in FIG. 6) through the wiring 21 and the first switch element SW1H. When the first switch element SW1L is turned on (coupling state), the drive signal supply circuit 20 supplies the second voltage signals VL to the drive electrode Tx (drive electrodes Tx-2 and Tx-4 in FIG. 6) through the wiring 22 and the first switch element SW1L. To facilitate the reader's understanding, the drive electrodes Tx supplied with the first voltage signals VH and the drive electrodes Tx at an intermediate potential VI (refer to FIG. 9) are hatched to be distinguished from the drive electrodes Tx supplied with the second voltage signals VL in FIG. 6 and other drawings.

The first switch element SW1H and the first switch element SW1L perform operations opposite to each other. When the first switch element SW1H is turned on, the first switch element SW1L is turned off (decoupling state). When the first switch element SW1H is turned off, the first switch element SW1L is turned on.

As described above, the drive signals VTP (the first voltage signals VH or the second voltage signals VL) corresponding to the predetermined code are supplied by the operations of the first switch elements SW1H and SW1L.

Let us focus on the drive electrodes Tx-1 and Tx-2 disposed side by side out of the drive electrodes Tx. In the example illustrated in FIG. 6, the drive signal supply circuit 20 supplies the first voltage signals VH to one of the drive electrode Tx-1 (first drive electrode) and the drive electrode Tx-2 (second drive electrode). The drive signal supply circuit 20 supplies the second voltage signals VL having an electric potential different from that of the first voltage signals VH to the other of the drive electrode Tx-1 (first drive electrode) and the drive electrode Tx-2 (second drive electrode).

First ends of the second switch elements SW2 are coupled to the common wiring 23. Second ends of the second switch elements SW2 are coupled to the left ends of the respective drive electrodes Tx. When the second switch elements SW2 are turned on, the drive electrodes Tx are coupled through the wiring 23 and the second switch elements SW2. In other words, when the second switch elements SW2 are turned on, the drive electrodes Tx short out. The second switch elements SW2 switch between coupling and decoupling of at least two drive electrodes Tx (e.g., the drive electrodes Tx-1 and Tx-2) supplied with the first voltage signals VH and the second voltage signals VL having different electrical potentials.

Figure 7:
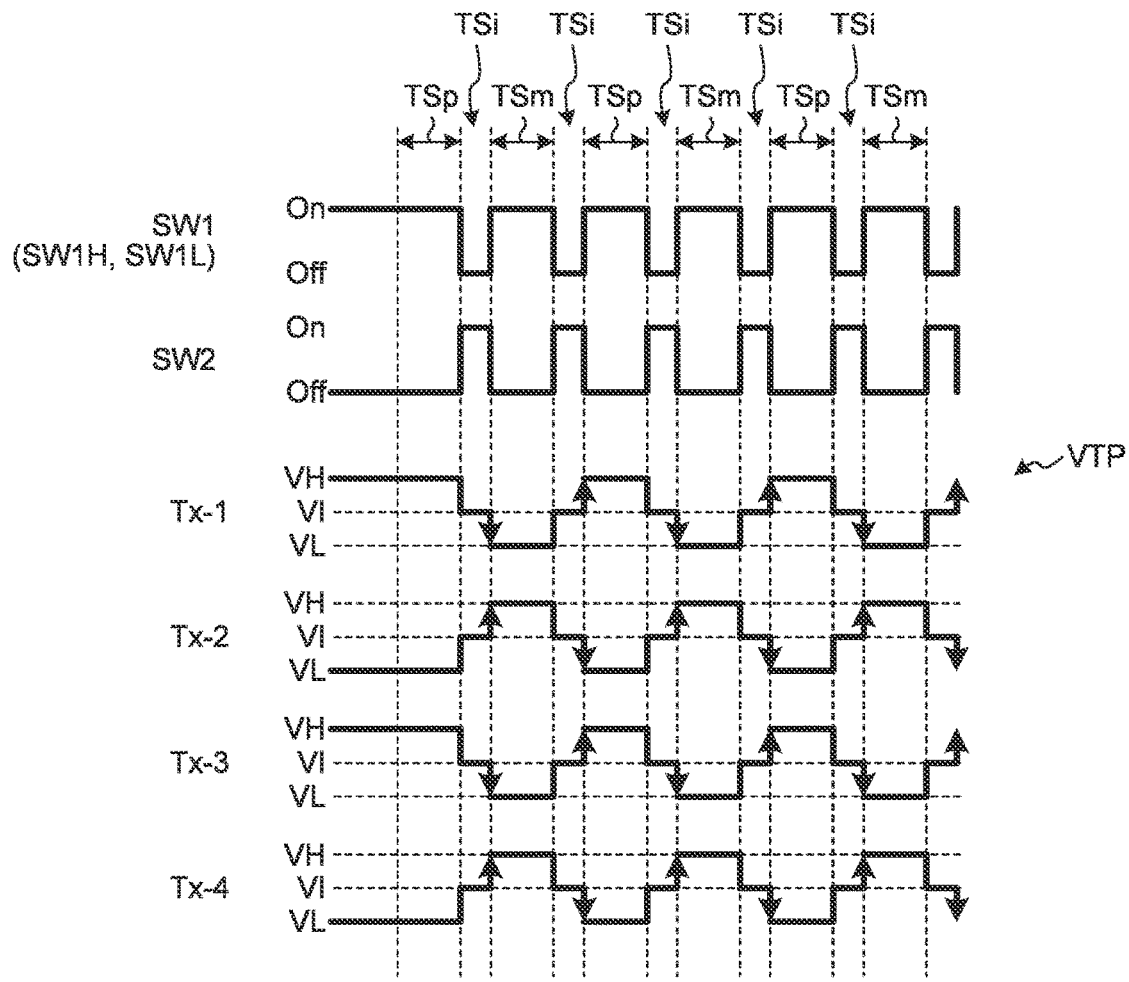
FIG. 7 is a timing waveform chart for explaining a method for driving the drive electrodes.
Figure 8:
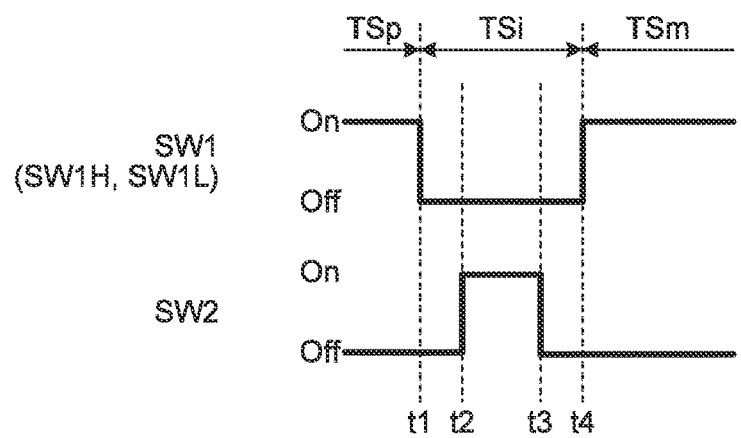
FIG. 8 is a timing waveform chart for explaining an operation of switching first switch elements and a second switch element.
Figure 9:
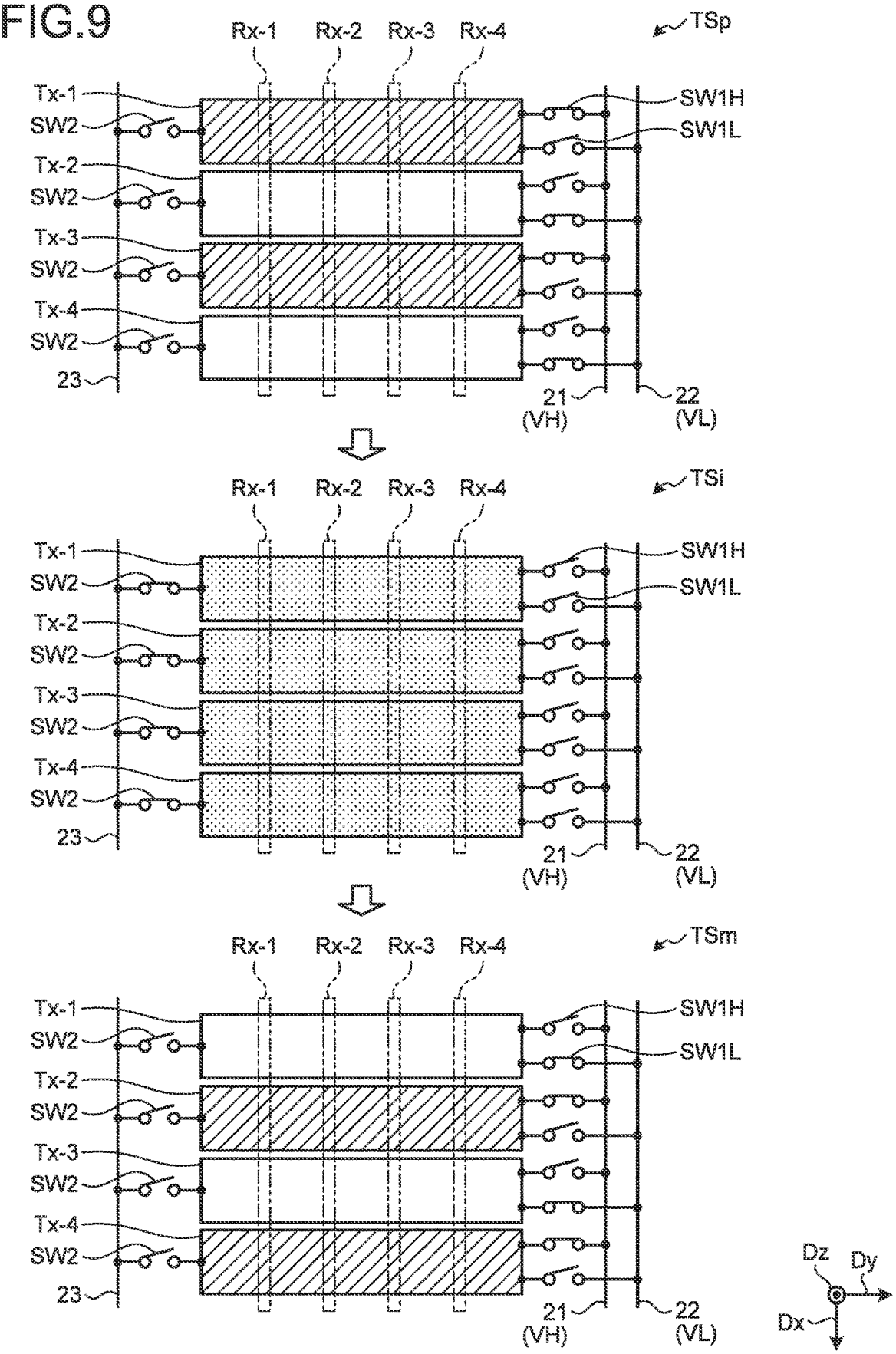
FIG. 9 is a diagram for explaining the method for driving the drive electrodes in a first period, a second period, and a third period.

FIG. 7 is a timing waveform chart for explaining a method for driving the drive electrodes. FIG. 8 is a timing waveform chart for explaining an operation of switching the first switch elements and the second switch element. FIG. 9 is a diagram for explaining the method for driving the drive electrodes in a first period, a second period, and a third period.

FIGS. 7 to 9 illustrate an example where code inversion drive is performed in one code period (period for performing drive corresponding to the elements in a predetermined row of the square matrix H). As illustrated in FIG. 7, for example, the detecting device 100 has a first period TSp, a second period TSi, and a third period TSm. The first period TSp is a period for supplying the drive electrodes Tx with the drive signals VTP the phase of which is determined based on the predetermined code. The third period TSm is a code inversion period for supplying the drive electrodes Tx with the drive signals VTP the phase of which is determined based on a code obtained by inverting the polarity of the predetermined code. The second period TSi is a transition period provided between the first period TSp and the third period TSm.

As illustrated in FIG. 7, the periods are repeatedly arranged like the first period TSp, the second period TSi, the third period TSm, the second period TSi, the first period TSp, . . . .

In the first period TSp, as illustrated in FIGS. 7 and 9, the drive signal supply circuit 20 supplies the drive electrodes Tx with the drive signals VTP having a phase corresponding to the elements (1,−1,1,−1) in the second row of the square matrix H. Specifically, the drive electrodes Tx-1 and Tx-3 are supplied with the first voltage signals VH, and the drive electrodes Tx-2 and Tx-4 are supplied with the second voltage signals VL. In the first period TSp, one of the first switch elements SW1H and SW1L is turned on, and the other is turned off for each of the drive electrodes Tx based on the elements (1,−1,1,−1). In the first period TSp, all the second switch elements SW2 are turned off, and the left ends of the drive electrodes Tx are decoupled from one another.

In the second period TSi, all the first switch elements SW1 are turned off, and the drive electrodes Tx are decoupled from the drive signal supply circuit 20. In other words, when the period is switched from the first period TSp to the second period TSi, supplying the first voltage signals VH to the drive electrodes Tx-1 and Tx-3 is stopped, and supplying the second voltage signals VL to the drive electrodes Tx-2 and Tx-4 is stopped. In addition to turning off the first switch elements SW1, the drive signal supply circuit 20 may also stop supplying electric potential to the wiring 21 and 22.

In the second period TSi, all the second switch elements SW2 are turned on, and the drive electrodes Tx are coupled through the wiring 23 and the second switch elements SW2. More specifically, as illustrated in FIG. 8, all the first switch elements SW1 are turned off at time t1, and supplying the drive signals VTP (the first voltage signals VH and the second voltage signals VL) to the drive electrodes Tx is stopped. After a predetermined period of time has elapsed, all the second switch elements SW2 are turned on at time t2, and the left ends of the drive electrodes Tx are coupled.

As described above, the drive electrodes Tx-1 and Tx-3 supplied with the first voltage signals VH and the drive electrodes Tx-2 and Tx-4 supplied with the second voltage signals VL are coupled. As a result, the electric potential of the drive electrodes Tx is the intermediate potential VI in the second period TSi. The intermediate potential VI is an electric potential between the first voltage signal VH and the second voltage signal VL and is ideally expressed by: VI=(VH+VL)/2.

In the third period TSm, code inversion drive is performed, and the drive electrodes Tx are driven based on the elements (−1,1,−1,1) obtained by inverting the polarity of the elements (1,−1,1,−1) in the second row of the square matrix H described above. In other words, the drive electrodes Tx-1 and Tx-3 are supplied with the second voltage signals VL, and the drive electrodes Tx-2 and Tx-4 are supplied with the first voltage signals VH. In the third period TSm, one of the first switch elements SW1H and SW1L is turned on, and the other is turned off for each of the drive electrodes Tx based on the inverted elements (−1,1,−1,1). All the second switch elements SW2 are turned off, and the left ends of the drive electrodes Tx are decoupled from one another.

More specifically, as illustrated in FIG. 8, all the second switch elements SW2 are turned off at time t3, and the left ends of the drive electrodes Tx are decoupled from one another. After a predetermined period of time has elapsed, all the first switch elements SW1 are turned on at time t4, and the drive signals VTP (the first voltage signals VH and the second voltage signals VL) are supplied to the drive electrodes Tx.

Subsequently, drive is repeatedly performed like the third period TSm, the second period TSi, the first period TSp, the second period TSi, and the third period TSm as illustrated in FIG. 7. The electric potential of the drive signals VTP supplied to the drive electrodes Tx repeatedly changes like the first voltage signal VH, the intermediate potential VI, the second voltage signal VL, the intermediate potential VI, the first voltage signal VH, the intermediate potential VI, . . . .

While FIGS. 7 to 9 illustrate an example where the intermediate potential VI is formed by the operations of the second switch elements SW2 in code inversion drive, the detecting device 100 may perform the operations in the second period TSi when shifting from the drive corresponding to the elements in the second row of the square matrix H to the drive corresponding to the elements in the third row of the square matrix H. While FIGS. 7 to 9 illustrate a case where the number of drive electrodes Tx supplied with the first voltage signals VH is equal to the number of drive electrodes Tx supplied with the second voltage signals VL to simplify the explanation, the present embodiment is not limited thereto. The number of drive electrodes Tx supplied with the first voltage signals VH may be different from the number of drive electrodes Tx supplied with the second voltage signals VL. In other words, the value of the intermediate potential VI also becomes a different potential depending on the number of drive electrodes Tx supplied with the first voltage signals VH and the number of drive electrodes Tx supplied with the second voltage signals VL. While FIGS. 6 to 9 illustrate an example where the drive signals VTP (the first voltage signals VH or the second voltage signals VL) are supplied to four drive electrodes Tx-1, Tx-2, Tx-3, and Tx-4 based on a predetermined code, the present embodiment is not limited thereto. The drive signals VTP may be supplied to all the drive electrodes Tx in the detection region FA.

As described above, the detecting device 100 according to the present embodiment includes a plurality of drive electrodes Tx, a plurality of detection electrodes Rx, the drive signal supply circuit 20, and a plurality of second switch elements SW2 (switch elements). The drive electrodes Tx are arrayed in the first direction Dx. The detection electrodes Rx are arrayed in the second direction Dy intersecting the first direction Dx. The drive signal supply circuit 20 supplies the drive signals VTP to the drive electrodes Tx. The second switch elements SW2 switch between coupling and decoupling of the drive electrodes Tx. The drive electrodes Tx include at least the drive electrode Tx-1 (first drive electrode) and the drive electrode Tx-2 (second drive electrode) disposed side by side in the first direction Dx. The drive signal supply circuit 20 supplies the first voltage signal VH to one of the drive electrode Tx-1 and the drive electrode Tx-2 and supplies the second voltage signal VL having an electric potential different from that of the first voltage signal VH to the other of the drive electrode Tx-1 and the drive electrode Tx-2. The second switch elements SW2 switch between coupling and decoupling of at least the drive electrode Tx-1 and the drive electrode Tx-2.

In the detecting device 100 according to the present embodiment, the electric potential of the drive electrodes Tx shifts from the first voltage signal VH to the second voltage signal VL through the intermediate potential VI or from the second voltage signal VL to the first voltage signal VH through the intermediate potential VI by the operations of the second switch elements SW2 in the second period TSi. As a result, the drive signal supply circuit 20 can make the amplitude of the drive signals VTP supplied to the drive electrodes Tx (the potential difference between the intermediate potential VI and the first voltage signal VH or between the intermediate potential VI and the second voltage signal VL) smaller than the amplitude in drive for shifting the electric potential between the first voltage signal VH and the second voltage signal VL not through the intermediate potential VI. Consequently, the detecting device 100 can reduce power consumption.

Second Embodiment

Figure 10:
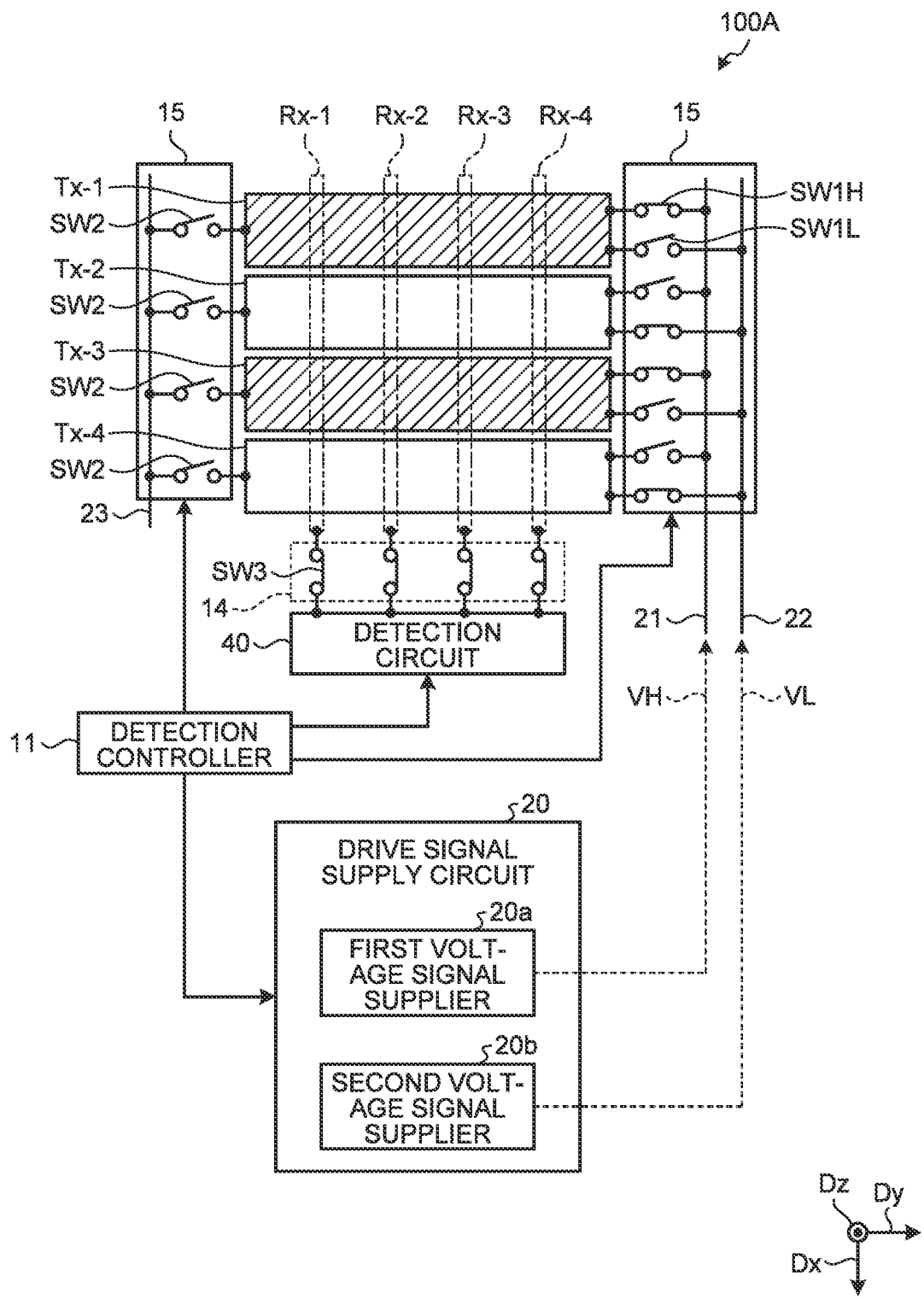
FIG. 10 is a diagram for explaining a coupling configuration of a plurality of drive electrodes and a plurality of detection electrodes in a detecting device according to a second embodiment.

FIG. 10 is a diagram for explaining the coupling configuration of a plurality of drive electrodes and a plurality of detection electrodes in the detecting device according to a second embodiment. In the following description, the same components as those described in the embodiment above are denoted by like reference numerals, and overlapping explanation thereof is omitted.

As illustrated in FIG. 10, the detection electrode selection circuit 14 in a detecting device 100A according to the second embodiment includes third switch elements SW3 corresponding to respective detection electrodes Rx-1, Rx-2, Rx-3, and Rx-4. The detection electrode selection circuit 14 switches the coupling state between the detection electrodes Rx and the detection circuit 40 by the operations of the third switch elements SW3. When the third switch elements SW3 are turned on, the detection electrodes Rx are coupled to the detection circuit 40 and output the detection signals Vdet to the detection circuit 40. When the third switch elements SW3 are turned off, the detection electrodes Rx are decoupled from the detection circuit 40. The detection electrodes Rx are not coupled to anywhere and are in a floating state.

Figure 11:
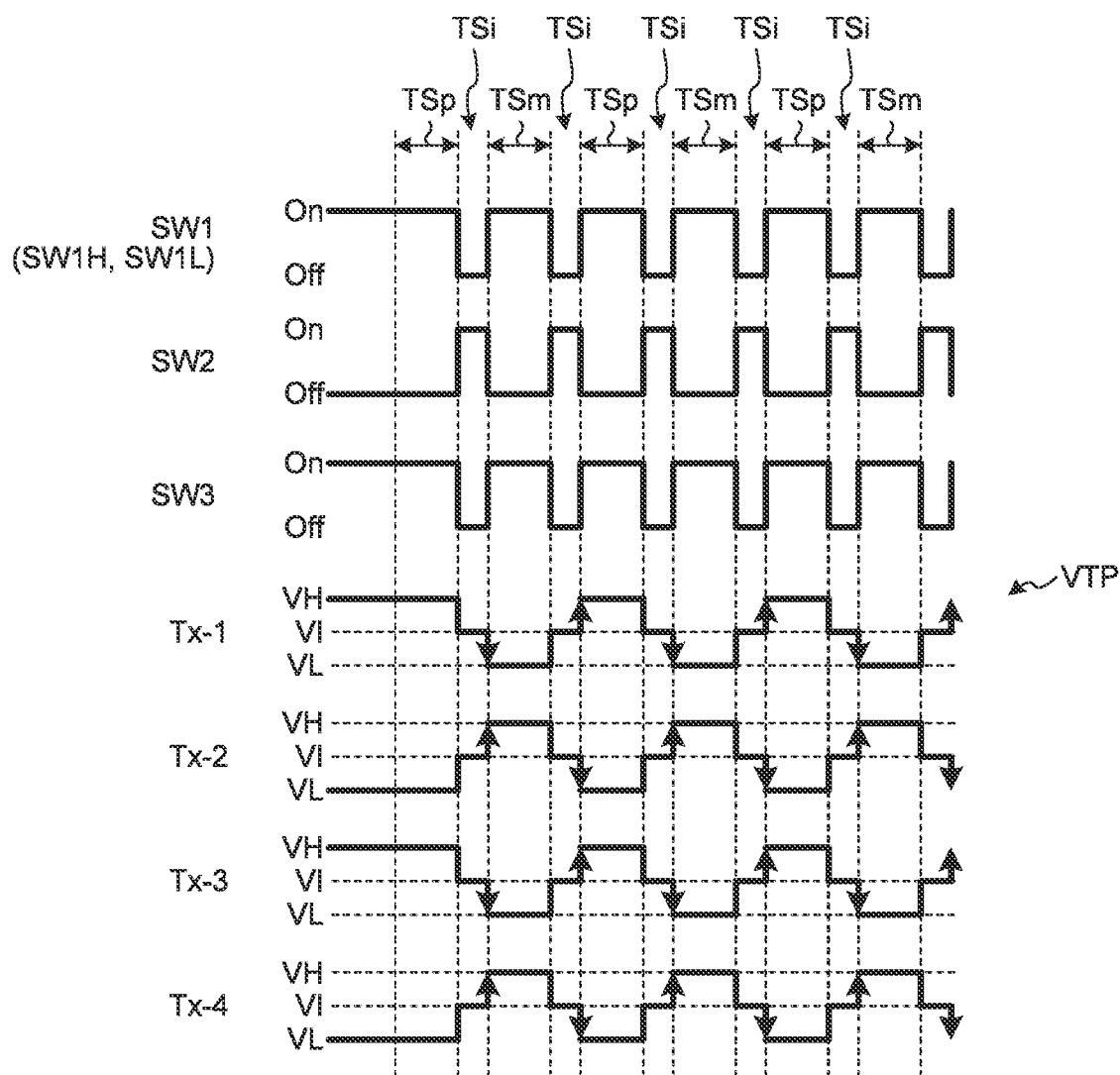
FIG. 11 is a timing waveform chart for explaining the method for driving the drive electrodes and the coupling configuration of the detection electrodes.
Figure 12:
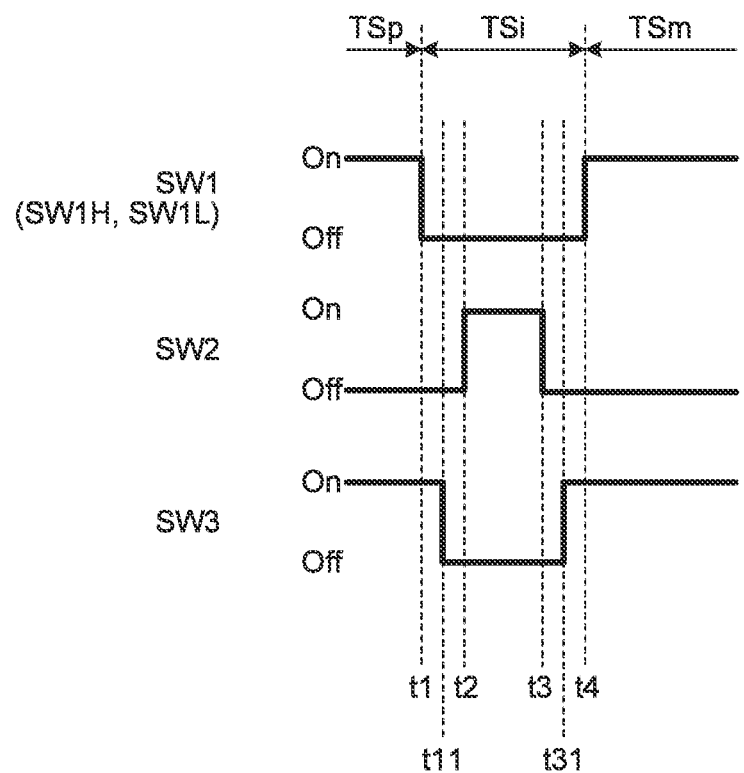
FIG. 12 is a timing waveform chart for explaining an operation of switching the first switch elements, the second switch element, and a third switch element.

FIG. 11 is a timing waveform chart for explaining the method for driving the drive electrodes and the coupling configuration of the detection electrodes. FIG. 12 is a timing waveform chart for explaining an operation of switching the first switch elements, the second switch element, and the third switch element.

As illustrated in FIG. 11, the operations of the first switch elements SW1 and the second switch elements SW2 are the same as the first embodiment (FIGS. 6 to 9) described above, and the waveforms of VTP supplied to the drive electrodes Tx are the same as the first embodiment (FIGS. 6 to 9). The detection electrode selection circuit 14 turns on the third switch elements SW3 in the first period TSp and the third period TSm (refer to FIG. 10). As a result, the detection electrodes Rx are coupled to the detection circuit 40 and output the detection signals Vdet based on the predetermined code to the detection circuit 40.

The detection electrode selection circuit 14 turns off the third switch elements SW3 in the second period TSi. As a result, the detection electrodes Rx are decoupled from the detection circuit 40 and are in a floating state.

More specifically, as illustrated in FIG. 12, all the first switch elements SW1 are turned off at time t1, and supplying the drive signals VTP (the first voltage signals VH and the second voltage signals VL) to the drive electrodes Tx is stopped. After a predetermined period of time has elapsed, the third switch elements SW3 are turned off at time t11 before time t2, and the detection electrodes Rx are decoupled from the detection circuit 40 (floating state). Subsequently, all the second switch elements SW2 are turned on at time t2, and the left ends of the drive electrodes Tx are coupled.

All the second switch elements SW2 are turned off at time t3, and the left ends of the drive electrodes Tx are decoupled from one another. After a predetermined period of time has elapsed, the third switch elements SW3 are turned on at time t31 before time t4, and the detection electrodes Rx are coupled to the detection circuit 40. Subsequently, all the first switch elements SW1 are turned on at time t4, and the drive signals VTP (the first voltage signals VH and the second voltage signals VL) are supplied to the drive electrodes Tx.

As described above, the detection electrodes Rx are brought into a floating state in the second period TSi by the operations of the third switch elements SW3. More specifically, time t2 and t3 when the second switch elements SW2 are switched between turned on and off overlap the period of time when the third switch elements SW3 are turned off, and they are positioned between time t11 and time t31 when the detection electrodes Rx are in a floating state. This mechanism can prevent noise due to the on-off operations of the second switch elements SW2 from being superimposed on the detection signals Vdet output from the detection electrodes Rx. Consequently, the detecting device 100A can suppress reduction in detection accuracy.

While the detection electrode selection circuit 14 turns on all the third switch elements SW3 in FIG. 10, the present embodiment is not limited thereto. The detection electrode selection circuit 14 may turn on part of the third switch elements SW3 and turn off the other part of the third switch elements SW3, thereby coupling the selected detection electrodes Rx to the detection circuit 40 in the first period TSp and the third period TSm. The configuration of the second embodiment can be combined with the configurations of embodiments and modifications described later.

Third Embodiment

Figure 13:
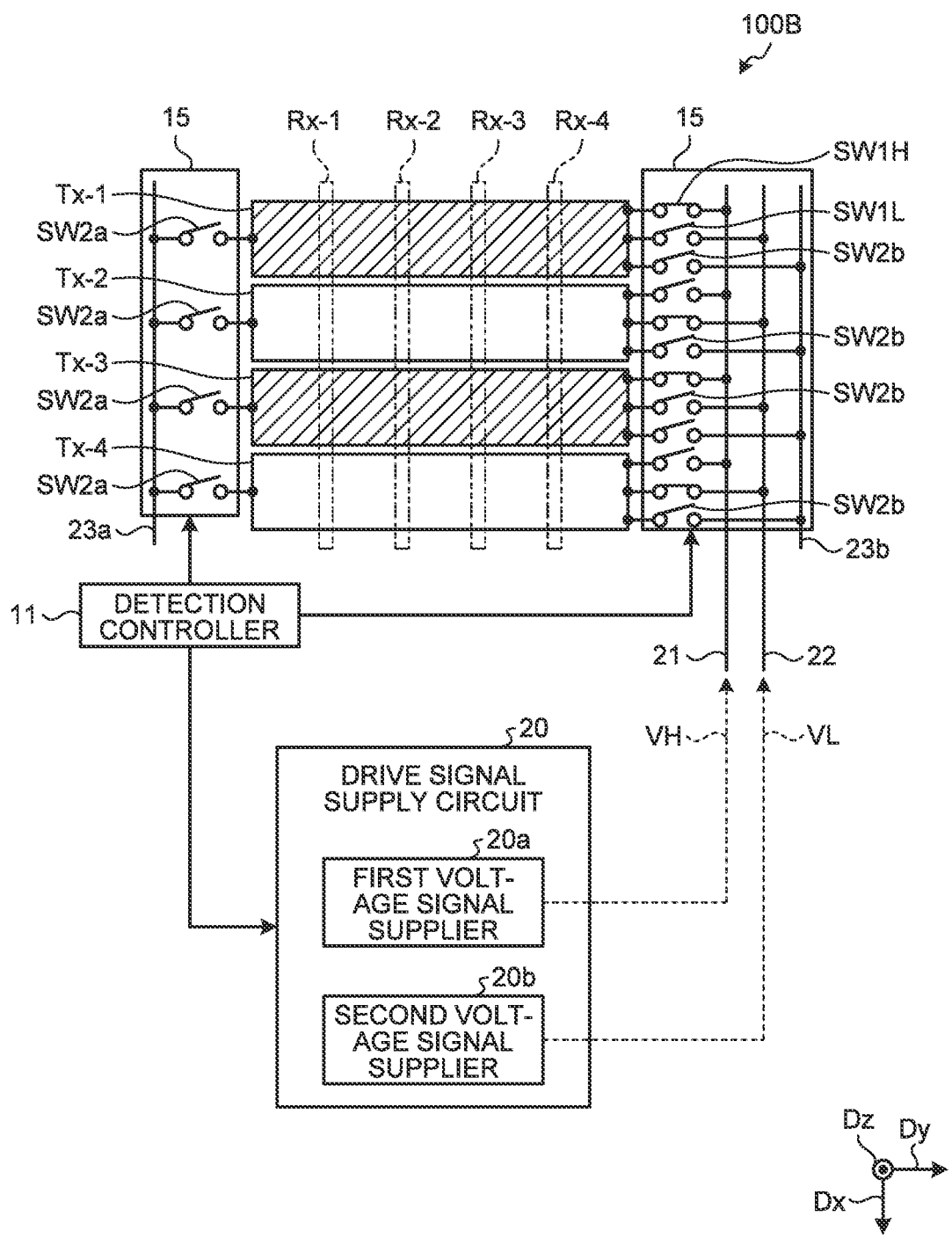
FIG. 13 is a diagram for explaining a coupling configuration of a plurality of drive electrodes according to a third embodiment.

FIG. 13 is a diagram for explaining the coupling configuration of a plurality of drive electrodes according to a third embodiment. As illustrated in FIG. 13, a detecting device 100B of the third embodiment includes a plurality of second switch elements SW2a and SW2b and a plurality of wires 23a and 23b. The second switch elements SW2a and SW2b and the wires 23a and 23b are coupled to the left ends and the right ends of the drive electrodes Tx. More specifically, the second switch elements SW2a and the wires 23a are coupled to the left ends of the respective drive electrodes Tx. The second switch elements SW2b and the wires 23b are coupled to the right ends of the respective drive electrodes Tx. First ends of the second switch elements SW2b are coupled to the right ends of the respective drive electrodes Tx, and second ends of the second switch elements SW2b are coupled to the common wire 23b. The second switch elements SW2a coupled to the left ends of the respective drive electrodes Tx and the second switch elements SW2b coupled to the right ends of the respective drive electrodes Tx are synchronously switched between tuned on and off.

Two second switch elements SW2a and SW2b are coupled to one drive electrode Tx. This configuration can reduce the total resistance of the second switch elements SW2a and SW2b compared with the first and the second embodiments described above. If the period is switched from the first period TSp to the second period TSi, for example, when the drive electrodes Tx-1 and Tx-3 supplied with the first voltage signals VH and the drive electrodes Tx-2 and Tx-4 supplied with the second voltage signals VL are coupled, electric charges move at both ends of the drive electrodes Tx. Consequently, the present embodiment can shorten the time required for transition from the first voltage signal VH to the intermediate potential VI or transition from the second voltage signal VL to the intermediate potential VI.

First Modification of the Third Embodiment

Figure 14:
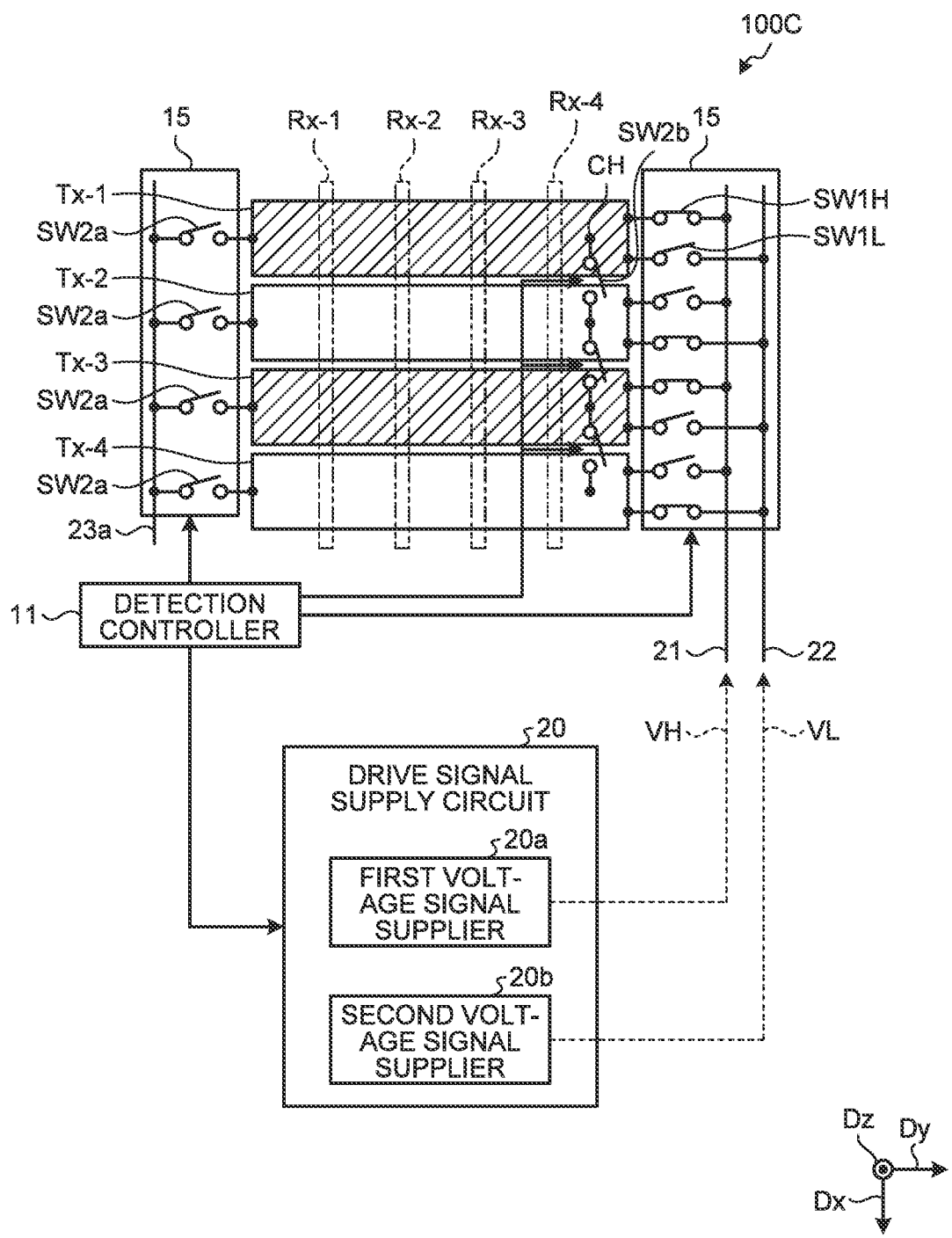
FIG. 14 is a diagram for explaining a coupling configuration of a plurality of drive electrodes according to a first modification of the third embodiment.

FIG. 14 is a diagram for explaining the coupling configuration of a plurality of drive electrodes according to a first modification of the third embodiment. While two second switch elements SW2a and SW2b in the third embodiment describe above are coupled to both ends of each drive electrode Tx, the present embodiment is not limited thereto. In a detecting device 100C according to the first modification of the third embodiment, the second switch elements SW2b are each provided between two drive electrodes Tx disposed side by side as illustrated in FIG. 14.

The following describes the coupling configuration of the drive electrodes Tx-1 and Tx-2 out of the drive electrodes Tx, for example. The left ends of the drive electrodes Tx-1 and Tx-2 are coupled to the respective second switch elements SW2a and the wire 23a. At the right ends of the drive electrodes Tx-1 and Tx-2, a first end of the second switch element SW2*b* is coupled to the drive electrode Tx-1 through a contact portion CH, and a second end of the second switch element SW2*b* is coupled to the drive electrode Tx-2 through a contact portion CH.

As described above, the second switches SW2*a* and SW2*b* of the detecting device 100C can be coupled to any desired positions. The detecting device 100C can suppress an increase in the number of wires in the frame region GA compared with the third embodiment described above in the configuration where a plurality of second switch elements SW2*a* and SW2*b* are coupled to one drive electrode Tx. The detecting device 100C does not necessarily have the configuration where two second switch elements SW2*a* and SW2*b* are provided to one drive electrode Tx, and three or more second switch elements may be provided.

Second Modification of the Third Embodiment

Figure 15:
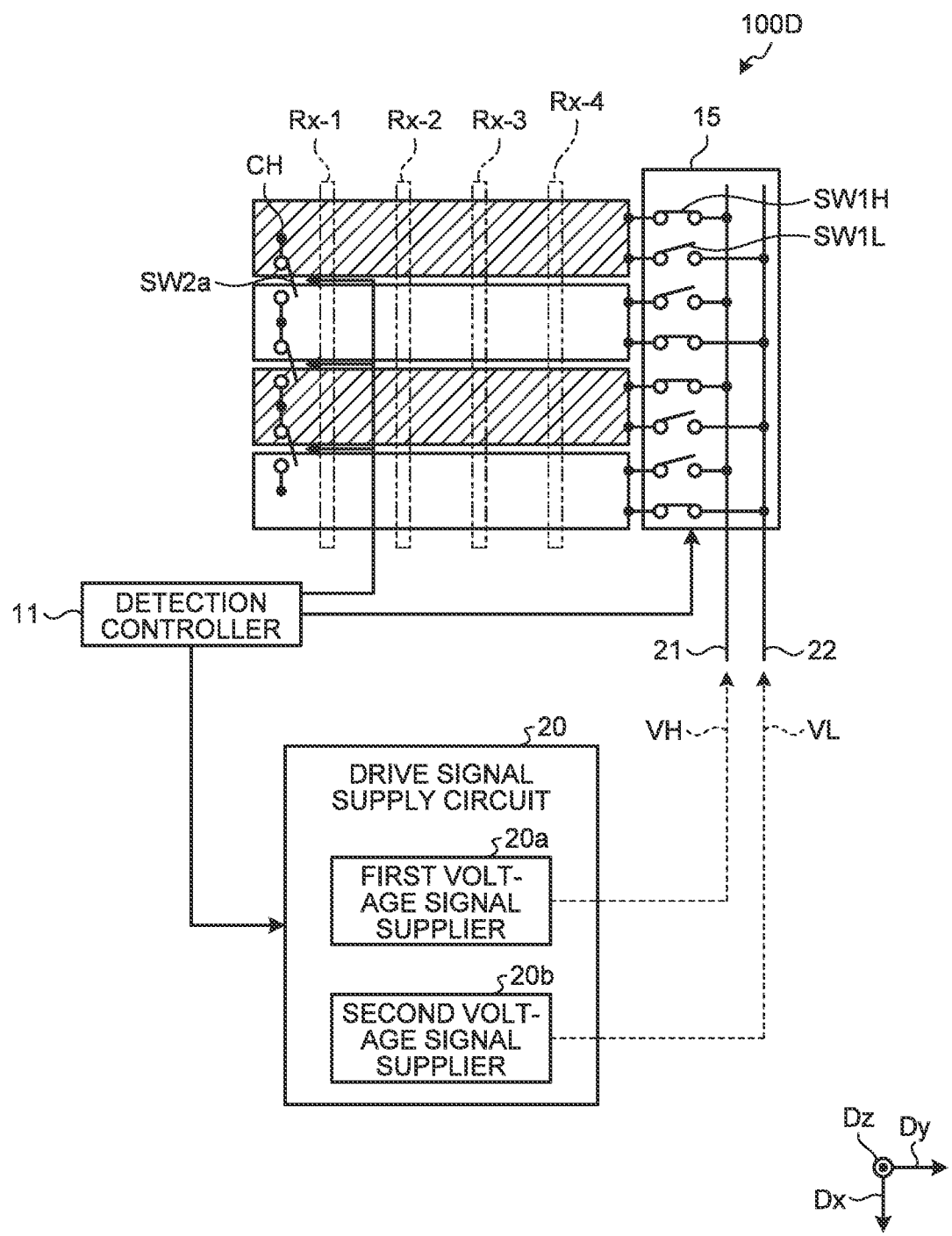
FIG. 15 is a diagram for explaining a coupling configuration of a plurality of drive electrodes according to a second modification of the third embodiment.

FIG. 15 is a diagram for explaining the coupling configuration of a plurality of drive electrodes according to a second modification of the third embodiment. In a detecting device 100D according to the second modification of the third embodiment, the second switch elements SW2*a* provided at the left ends of the drive electrodes Tx are each provided between two drive electrodes Tx disposed side by side as illustrated in FIG. 15.

More specifically, the following describes the coupling configuration of the drive electrodes Tx-1 and Tx-2. At the left ends of the drive electrodes Tx-1 and Tx-2, a first end of the second switch element SW2*a* is coupled to the drive electrode Tx-1 through a contact portion CH, and a second end of the second switch element SW2*a* is coupled to the drive electrode Tx-2 through a contact portion CH. In other words, the drive electrode selection circuit 15 is not provided in the frame region GA at the left ends of the drive electrodes Tx. Consequently, the detecting device 100D can suppress an increase in the number of switch elements and wires in the frame region GA at the left ends of the drive electrodes Tx compared with the embodiments described above. The configuration illustrated in the second modification of the third embodiment is applied to a detecting device 100H (refer to FIG. 22) of a sixth embodiment, which will be described later.

Fourth Embodiment

Figure 17:
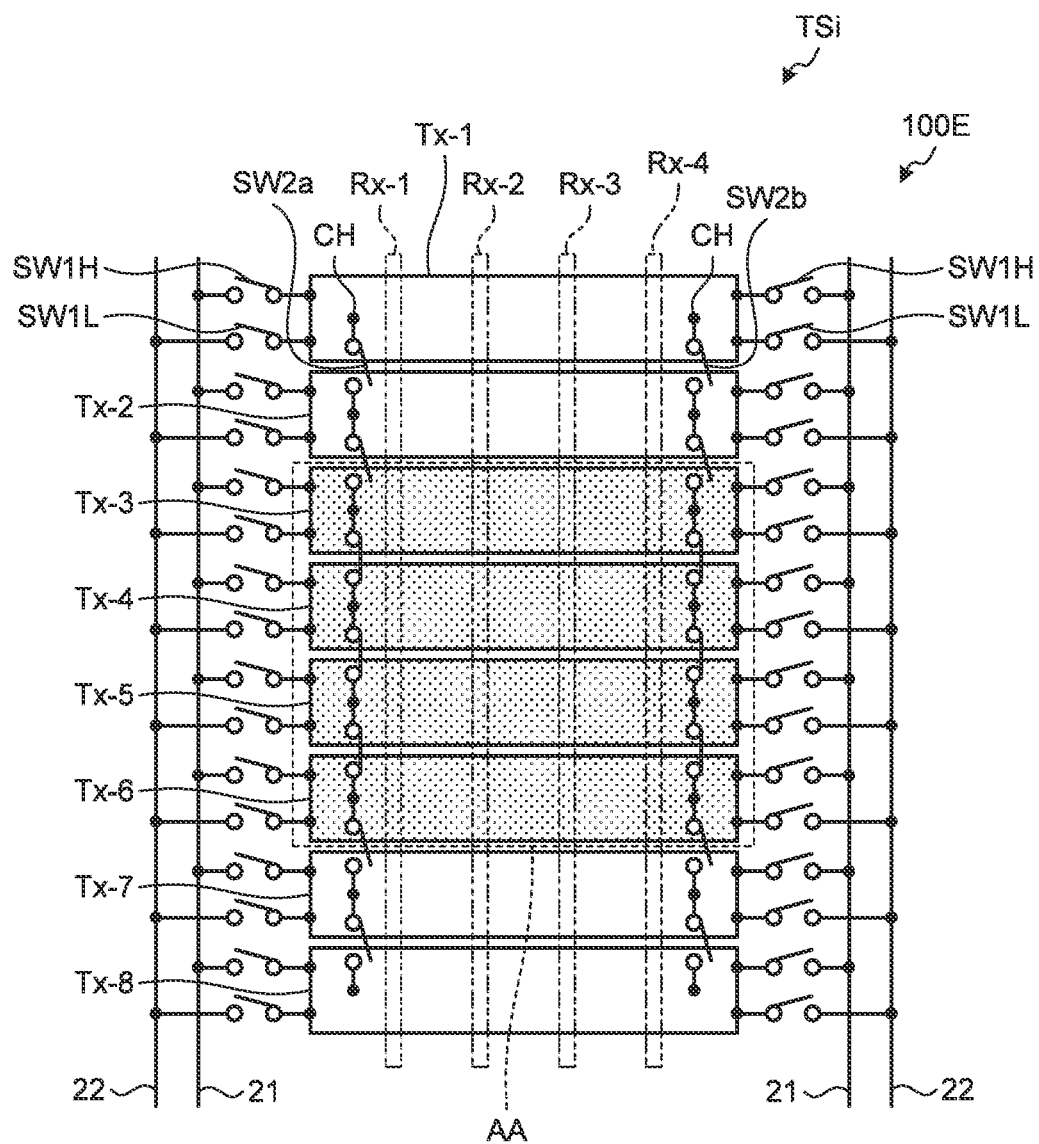
FIG. 17 is a diagram for explaining the coupling configuration of the drive electrodes according to the fourth embodiment in a second period.

FIG. 16 is a diagram for explaining the coupling configuration of a plurality of drive electrodes according to a fourth embodiment in the first period. FIG. 17 is a diagram for explaining the coupling configuration of the drive electrodes according to the fourth embodiment in the second period.

In a detecting device 100E according to the fourth embodiment, the first switch elements SW1H and SW1L and the wiring 21 and 22 are provided to both the left ends and the right ends of the drive electrodes Tx as illustrated in FIGS. 16 and 17. The first switch elements SW1H and SW1L at the left ends of the drive electrodes Tx and the first switch elements SW1H and SW1L at the right ends of the drive electrodes Tx are controlled so as to be synchronously switched between turned on and off.

With this configuration, the drive signal supply circuit 20 (refer to FIG. 6) is coupled to the left ends and the right ends of the drive electrodes Tx through the first switch elements SW1H and SW1L and the wiring 21 and 22. Thus, the drive signal supply circuit 20 (refer to FIG. 6) supplies the drive signals VTP to the first ends (left ends) and the second ends (right ends) of the drive electrodes Tx in the extending direction. Consequently, the detecting device 100E can shorten the time required for transition between the first voltage signal VH, the intermediate potential VI, and the second voltage signal VL compared with the embodiments described above.

Two second switch elements SW2*a* and SW2*b* are provided to one drive electrode Tx. The second switch elements SW2*a* and SW2*b* are each provided between two drive electrodes Tx disposed side by side in the first direction Dx at the left end and the right end of the drive electrode Tx. The configuration is not limited thereto, and the second switch elements SW2*a* and SW2*b* may employ a configuration in which both ends of one corresponding drive electrode Tx are coupled to each other like the third embodiment illustrated in FIG. 13.

The detecting device 100E according to the fourth embodiment performs fingerprint detection by driving part of the drive electrodes Tx (drive electrodes Tx-3 to Tx-6 in FIGS. 16 and 17) disposed in an active region AA out of the drive electrodes Tx (drive electrodes Tx-1 to Tx-8 in FIGS. 16 and 17).

Specifically, as illustrated in FIG. 16, the drive signal supply circuit 20 supplies the drive signals VTP having a phase corresponding to the square matrix H to the drive electrodes Tx-3, Tx-4, Tx-5, and Tx-6 in the active region AA in the first period TSp. In the drive electrodes Tx-1, Tx-2, Tx-7, and Tx-8 in a region other than the active region AA, all the first switch elements SW1H and SW1L and the second switch elements SW2*a* and SW2*b* are turned off, thereby bringing the drive electrodes Tx-1, Tx-2, Tx-7, and Tx-8 into a floating state. The drive electrodes Tx in a region other than the active region AA is not necessarily in a floating state and may be coupled to a predetermined reference potential (e.g., the ground potential).

Next, as illustrated in FIG. 17, all the first switch elements SW1H and SW1L are turned off in the second period TSi, and the drive electrodes Tx in the active region AA are decoupled from the drive signal supply circuit 20. In the second period TSi, the second switch elements SW2*a* and SW2*b* that couple the drive electrodes Tx in the active region AA are turned on, and the drive electrodes Tx-3, Tx-4, Tx-5, and Tx-6 in the active region AA are coupled through the second switch elements SW2*a* and SW2*b*.

As a result, the drive electrodes Tx-3 and Tx-5 supplied with the first voltage signals VH and the drive electrodes Tx-4 and Tx-6 supplied with the second voltage signals VL are coupled in the active region AA. Consequently, the electric potential of the drive electrodes Tx in the active region AA is the intermediate potential VI in the second period TSi.

Subsequently, the operations in the third period TSm, the second period TSi, the first period TSp, . . . are repeatedly performed on the drive electrodes Tx in the active region AA.

The detecting device 100E of the fourth embodiment performs CDM drive on only the drive electrodes Tx in the active region AA in the detection region FA. Consequently, the detecting device 100E can reduce power consumption and shorten the time required to scan the drive electrodes Tx compared with a case where fingerprint detection is performed on the whole detection region FA.

The active region AA may be a region specified in advance as a fingerprint detection region, that is, a fixed region. Alternatively, the active region AA may be a region specified based on the position of the finger Fg detected by driving all the drive electrodes Tx in the detection region FA in a time-division manner and performing touch detection (detection of the coordinates of the finger position in the detection region FA).

Third Modification of the Fourth Embodiment

Figure 18:
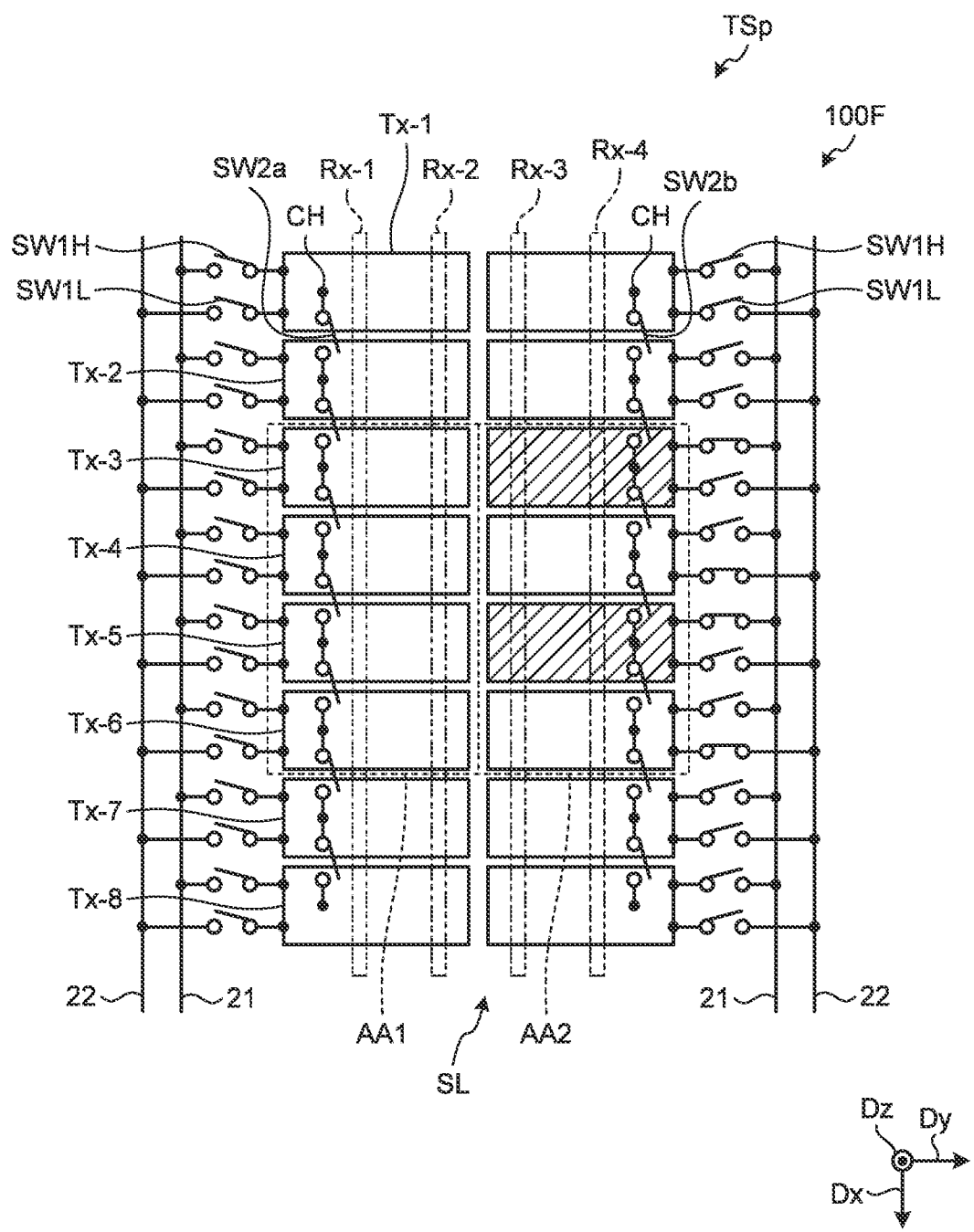
FIG. 18 is a diagram for explaining the coupling configuration of the drive electrodes according to a third modification of the fourth embodiment.

FIG. 18 is a diagram for explaining the coupling configuration of the drive electrodes according to a third modification of the fourth embodiment. In a detecting device 100F according to the third modification of the fourth embodiment, the drive electrodes Tx are each divided into a plurality of parts by a slit SL as illustrated in FIG. 18. The drive signal supply circuit 20 can independently supply the drive signals VTP to the drive electrodes Tx on the left side of the slits SL and the drive electrodes Tx on the right side of the slits SL.

In other words, the first switch elements SW1H and SW1L and the second switch elements SW2a coupled to the left ends of the drive electrodes Tx, and the first switch elements SW1H and SW1L and the second switch elements SW2b coupled to the right ends of the drive electrodes Tx are controlled so as to be independently switched between turned on and off.

In the example illustrated in FIG. 18, fingerprint detection is performed by the aforementioned CDM drive on the drive electrodes Tx-3, Tx-4, Tx-5, and Tx-6 in an active region AA2 on the right side of the slits SL out of the drive electrodes Tx-3, Tx-4, Tx-5, and Tx-6. In the drive electrodes Tx-3, Tx-4, Tx-5, and Tx-6 in an active region AA1 on the left side of the slits SL, all the first switch elements SW1H and SW1L and the second switch elements SW2a are turned off, thereby brining the drive electrodes Tx-3, Tx-4, Tx-5, and Tx-6 into a floating state. In this case, the detection electrodes Rx-3 and Rx-4 overlapping the active region AA2 output the detection signals Vdet. The detection electrodes Rx-1 and Rx-2 overlapping the active region AA1 does not output the detection signals Vdet.

The detecting device 100F according to the third modification of the fourth embodiment can make the area of the active region AA2 on which CDM drive is performed smaller than that of the fourth embodiment described above. In the detecting device 100F, the area of the drive electrode Tx supplied with the drive signals VTP is smaller (the length in the second direction Dy is shorter) than that of the fourth embodiment. Consequently, the detecting device 100F can suppress an increase in the time required for transition between the first voltage signal VH, the intermediate potential VI, and the second voltage signal VL.

Fifth Embodiment

Figure 19:
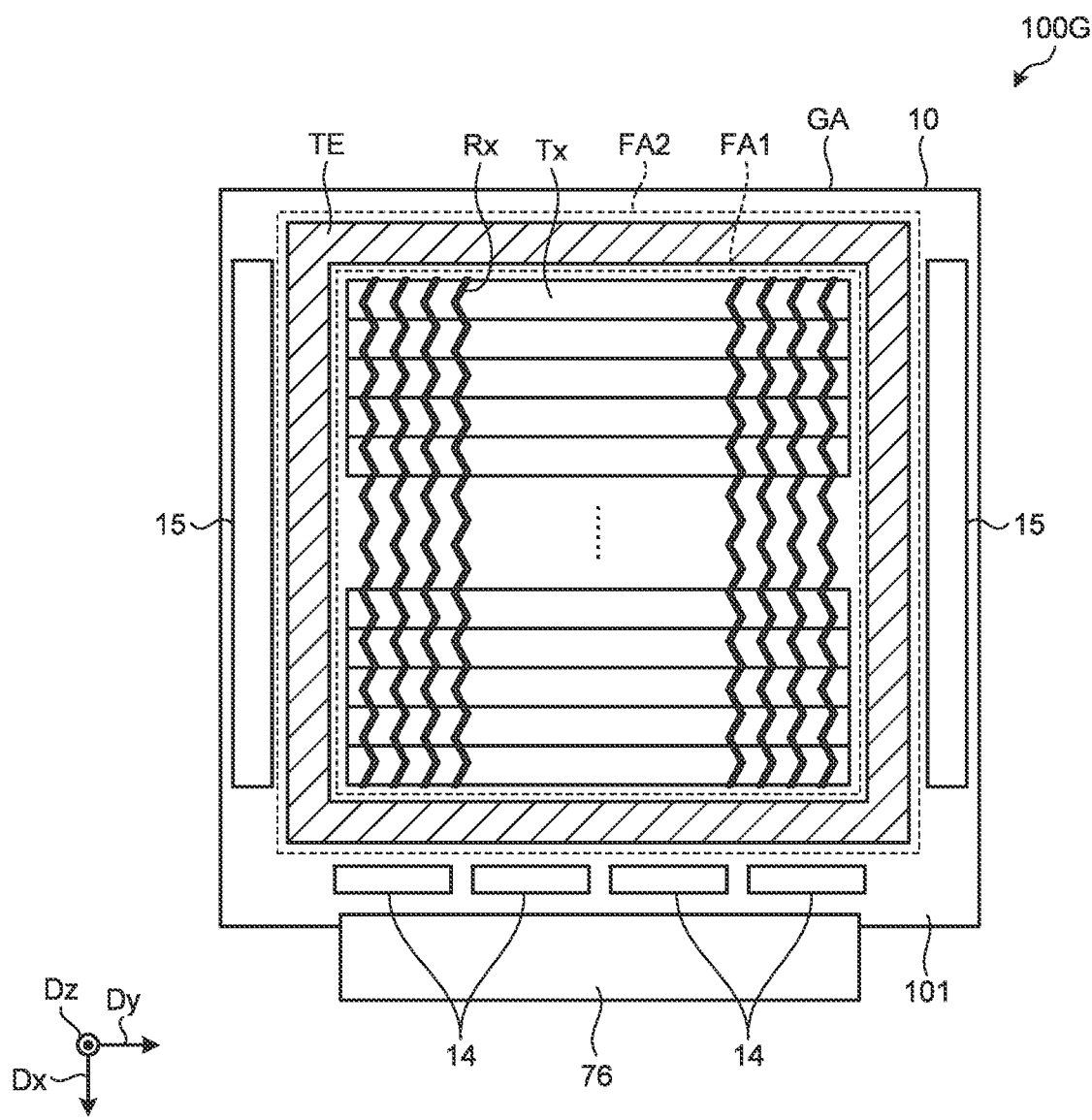
FIG. 19 is a plan view illustrating an example of a configuration of a detecting device according to a fifth embodiment.

FIG. 19 is a plan view illustrating an example of the configuration of the detecting device according to a fifth embodiment. As illustrated in FIG. 19, a detecting device 100G according to the fifth embodiment further includes a touch detection electrode TE in addition to the drive electrodes Tx and the detection electrodes Rx. The touch detection electrode TE is provided in a frame shape surrounding the drive electrodes Tx and the detection electrodes Rx. The drive electrodes Tx and the detection electrodes Rx are provided in a detection region FA1. The touch detection electrode TE is provided in a detection region FA2 outside the detection region FA1 (on the outer periphery of the substrate 101).

The touch detection electrode TE can detect contact or proximity of the finger Fg with or to the detection regions FA1 and FA2 by self-capacitive system touch detection, for example. The touch detection electrode TE may be directly coupled to the detection IC (not illustrated) not through the drive electrode selection circuit 15 or the detection electrode selection circuit 14. Alternatively, the drive electrode selection circuit 15 and the detection electrode selection circuit 14 may also be used for touch detection performed by the touch detection electrode TE. The touch detection electrode TE does not necessarily have one continuous frame shape and may be divided into a plurality of parts and disposed in the detection region FA2.

When a user brings the finger Fg closer to the detection region FA1 to perform fingerprint detection, at least part of the finger Fg overlaps (abuts on) the detection region FA2. The detecting device 100G according to the present embodiment has such a size with respect to the finger Fg of the user. With the touch detection electrode TE, the detecting device 100G substantially need not perform fingerprint detection drive except when the touch detection electrode TE detects a touch. Consequently, the configuration according to the present embodiment performs normal fingerprint detection drive in a touch detection period, while, in a period other than the touch detection period, the configuration does not perform fingerprint detection drive as an idling mode or intermittently performs fingerprint detection drive in a cycle much longer than that of fingerprint detection drive in the touch detection period.

Figure 20:
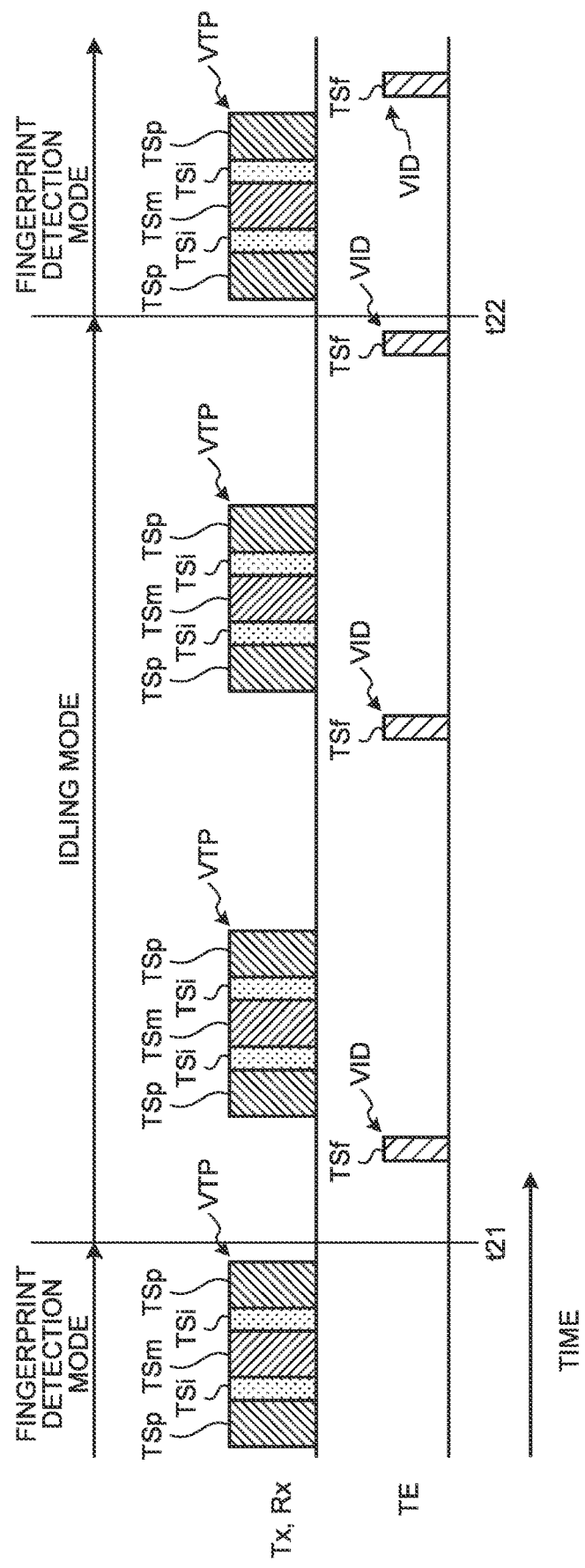
FIG. 20 is a diagram for explaining a method for driving the detecting device according to the fifth embodiment.

FIG. 20 is a diagram for explaining a method for driving the detecting device according to the fifth embodiment. As illustrated in FIG. 20, the detecting device 100G has a fingerprint detection mode (normal detection mode) and an idling mode. In the fingerprint detection mode, the detection controller 11 (refer to FIG. 4) performs the CDM drive described above on the drive electrodes Tx and the detection electrodes Rx to detect a fingerprint of the finger Fg. If no fingerprint is detected in a predetermined period of time (time t21), the detection controller 11 stops CDM drive and shifts to the idling mode.

In the idling mode, the detecting device 100G does not detect a fingerprint of the finger Fg. Specifically, in the idling mode, the detection controller 11 supplies drive signals VID to the touch detection electrode TE in a predetermined cycle to detect a touch, that is, contact or proximity of the finger Fg. The cycle of a touch detection period TSf for performing touch detection is set longer than the cycle of detection in the fingerprint detection mode.

In the idling mode, the detection controller 11 performs the CDM drive described above on the drive electrodes Tx and the detection electrodes Rx in a predetermined cycle. As a result, the detection controller 11 acquires base line signals for fingerprint detection in a state where the finger Fg is not present. The detection controller 11 compares the newly acquired base line signals with the conventional base line signals. If these base line signals are different, the detection controller 11 updates the base line signals with the newly acquired base line signals.

If contact or proximity of the finger Fg is detected in the touch detection period TSf (time t22), the detection controller 11 shifts from the idling mode to the fingerprint detection mode.

The present embodiment performs the same drive on the drive electrodes Tx and the detection electrodes Rx in the detection region FA1 in the fingerprint detection mode and the idling mode. The present embodiment repeatedly performs the operations in the first period TSp, the second period TSi, the third period TSm, the second period TSi, the first period TSp, . . . as described above.

While FIG. 20 illustrates a case where the detecting device 100G alternately performs touch detection (touch detection period TSf) by the touch detection electrodes TE and acquisition of the base line signals by the drive electrodes Tx and the detection electrodes Rx in the idling mode, the present embodiment is not limited thereto. In the period of the idling mode, for example, the detecting device 100G simply needs to acquire the base line signals by the drive electrodes Tx and the detection electrodes Rx at least once. After acquiring the base line signals, the detecting device 100G may repeatedly perform touch detection by the touch detection electrode TE in a plurality of predetermined cycles.

Fourth Modification of the Fifth Embodiment

Figure 21:
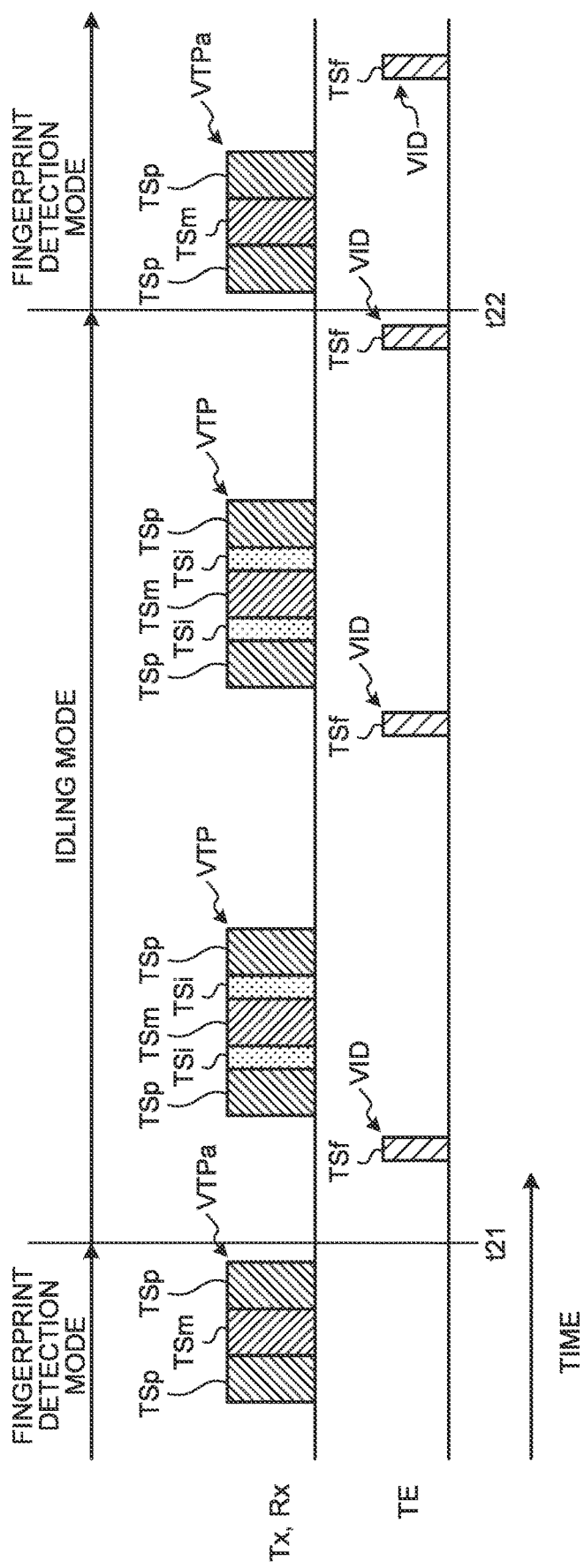
FIG. 21 is a diagram for explaining a method for driving a detecting device according to a fourth modification of the fifth embodiment.

FIG. 21 is a diagram for explaining the method for driving the detecting device according to a fourth modification of the fifth embodiment. As illustrated in FIG. 21, the detecting device 100G according to the fourth modification of the fifth embodiment is different from the aforementioned fifth embodiment in the operations in the fingerprint detection mode (normal detection mode).

Specifically, the fingerprint detection mode has no second period TSi, and the first periods TSp and the third periods TSm are repeatedly arranged. In other words, in the fingerprint detection mode, the detecting device 100G does not perform the operation in the second period TSi and alternately supplies the first voltage signals VH and the second voltage signals VL to the drive electrodes Tx not through the intermediate potential VI based on the predetermined code (square matrix H). In the idling mode, the detecting device 100G repeatedly performs the operations in the first period TSp, the second period TSi, the third period TSm, the second period TSi, the first period TSp, . . . as described above. In other words, in the idling mode, the detecting device 100G alternately supplies the first voltage signals VH and the second voltage signals VL to the drive electrodes Tx through the intermediate potential VI based on the predetermined code (square matrix H).

The fourth modification can increase the speed of scanning the drive electrodes Tx in the fingerprint detection mode and shorten the time required for fingerprint detection. By contrast, the fourth modification performs the drive for reducing power consumption described above in the idling mode having less restriction on the scanning speed. As described above, the detecting device 100G can switch the system of CDM drive on the drive electrodes Tx depending on the required characteristics (increase in scanning speed or reduction in power consumption).

While the fourth modification describes the example that switches the system of CDM drive on the drive electrodes Tx between the fingerprint detection mode and the idling mode in FIG. 21, the present modification is not limited thereto. The fourth modification, for example, may switch the system of CDM drive between fingerprint detection on the whole detection region FA and fingerprint detection on the partial active region AA. Alternatively, the fourth modification may switch the system of CDM drive based on the detection conditions, such as the resolution of detection.

Sixth Embodiment

Figure 22:
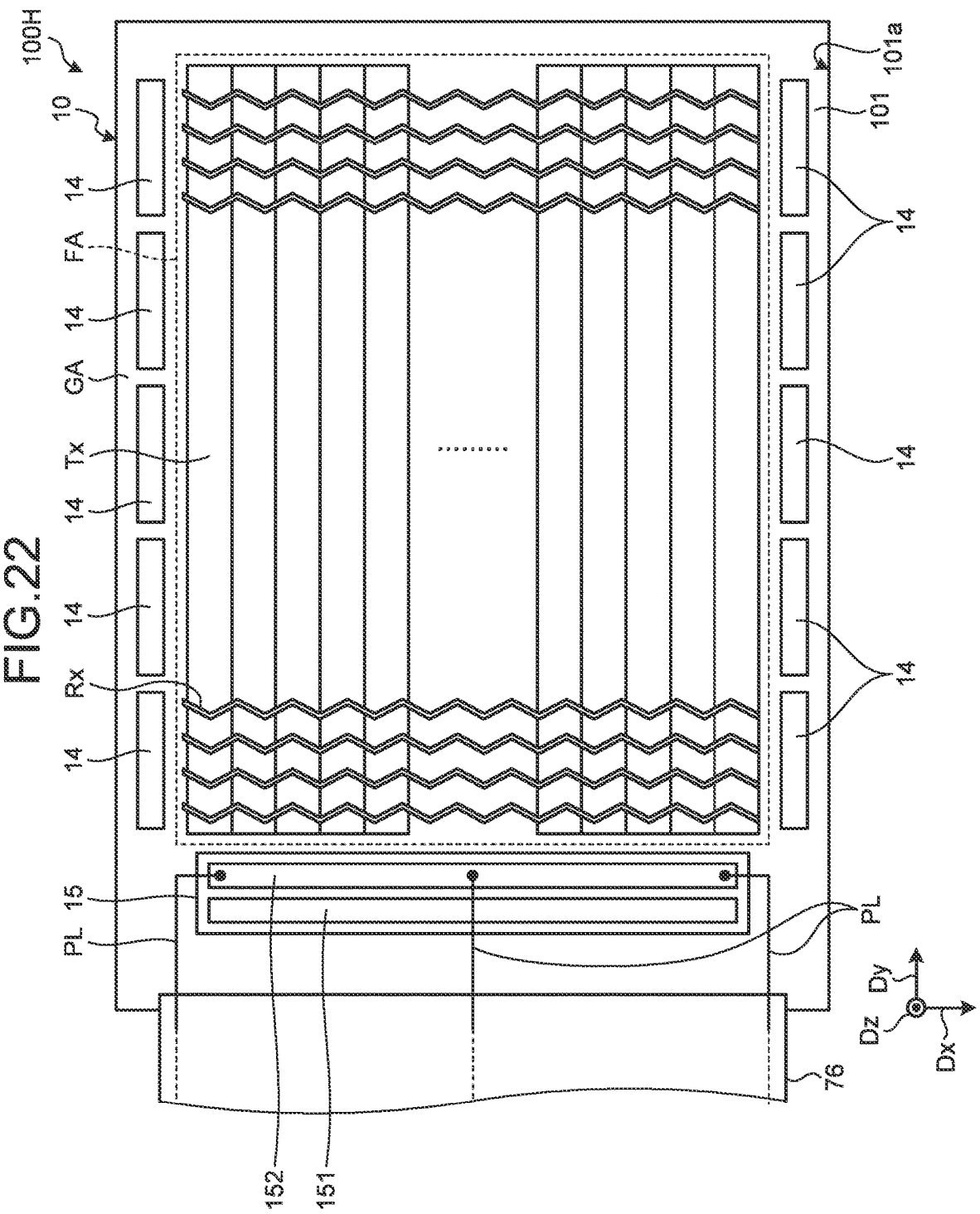
FIG. 22 is a plan view of an example of a configuration of a detecting device according to a sixth embodiment.

FIG. 22 is a plan view of an example of the configuration of the detecting device according to a sixth embodiment. A detecting device 100H of the sixth embodiment is different from the first to the fifth embodiments described above in the arrangement relation of the drive electrodes Tx and the detection electrodes Rx with the peripheral circuits and the wiring substrate 76. Specifically, as illustrated in FIG. 22, the drive electrode selection circuit 15 and the drive electrodes Tx are disposed side by side in the second direction Dy in which the drive electrodes Tx extend. The wiring substrate 76 is coupled to the side of the frame region GA provided with the drive electrode selection circuit 15. A plurality of detection electrode selection circuits 14 are disposed in a manner sandwiching the drive electrodes Tx in the first direction Dx.

The drive electrode selection circuit 15 includes a shift register circuit 151 and a buffer circuit 152. The shift register circuit 151 selects a plurality of drive electrodes Tx based on a predetermined code. The buffer circuit 152 amplifies the drive signals VTP and supplies them to the selected drive electrodes Tx. A plurality of power supply lines PL supply electric power to the buffer circuit 152 from the outside. The power supply lines PL, for example, supply electric power to both ends and the center part of the buffer circuit 152 in the first direction Dx. The sixth embodiment has little variation in the distance between the drive electrodes Tx and the drive electrode selection circuit 15. This configuration reduces the difference in resistance between the wires (not illustrated) that couple the drive electrodes Tx and the drive electrode selection circuit 15 and suppresses variation in the voltage of the drive signals VTP.

Seventh Embodiment

Figure 23:
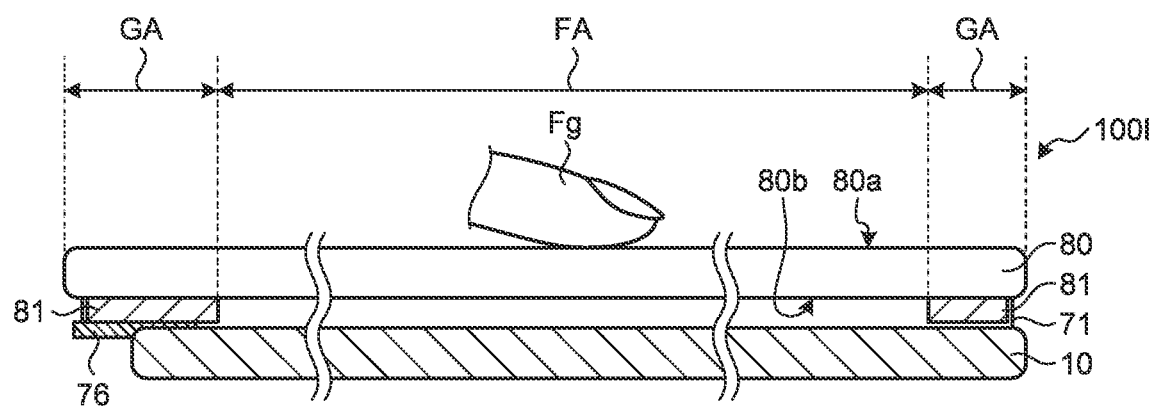
FIG. 23 is a sectional view of a schematic sectional configuration of a detecting device according to a seventh embodiment.

FIG. 23 is a sectional view of a schematic sectional configuration of the detecting device according to a seventh embodiment. As illustrated in FIG. 23, a detecting device 100I according to the seventh embodiment does not include the display panel 30 (refer to FIG. 2) and is provided as the detecting device 100I alone. The substrate 101, the drive electrodes Tx, the detection electrodes Rx, and other components of the detecting device 100I may be made of non-translucent material. The drive electrodes Tx and the detection electrodes Rx, for example, may be made of metal material. This configuration can increase the flexibility in arrangement of the switch elements, such as the second switch elements SW2.

The detecting device 100I does not necessarily include the cover member 80. In this case, the detecting device 100I may have a configuration in which a protective film (insulating film) that covers the drive electrodes Tx and the detection electrodes Rx is provided instead of the cover member 80.

While exemplary embodiments according to the present disclosure have been described, the embodiments are not intended to limit the disclosure. The contents disclosed in the embodiments are given by way of example only, and various changes may be made without departing from the spirit of the present disclosure. Appropriate modifications made without departing from the spirit of the present disclosure naturally fall within the technical scope of the present disclosure.

What is claimed is:
1. A detecting device comprising:
a plurality of drive electrodes arrayed in a first direction;
a plurality of detection electrodes arrayed in a second direction intersecting the first direction;
a drive signal supply circuit configured to supply a drive signal to the drive electrodes; and a plurality of switch elements configured to switch between coupling and decoupling between the drive electrodes, wherein the drive electrodes include at least a first drive electrode and a second drive electrode disposed side by side in the first direction, the drive signal supply circuit supplies a first voltage signal to one of the first drive electrode and the second drive electrode and supplies a second voltage signal having an electric potential different from an electric potential of the first voltage signal to another one of the first drive electrode and the second drive electrode, the switch elements switch between coupling and decoupling of at least the first drive electrode and the second drive electrode, the detecting device has a first period and a second period that differ in a coupling state of the switch elements, in the first period,
   the switch elements cause the first drive electrode to be decoupled from the second drive electrode, and
   the drive signal supply circuit supplies the first voltage signal to at least one or more of a plurality of the first drive electrodes and supplies the second voltage signal to at least one or more of a plurality of the second drive electrodes, and in the second period,
   the drive signal supply circuit stops supplying the first voltage signal to the first drive electrode and supplying the second voltage signal to the second drive electrode, and
   the switch elements couple the first drive electrode and the second drive electrode.

2. The detecting device according to claim 1, further having a third period after the second period, wherein
   in the third period,
      the switch elements cause the first drive electrode to be decoupled from the second drive electrode, and
      the drive signal supply circuit supplies the second voltage signal to at least one or more of the first drive electrodes and supplies the first voltage signal to at least one or more of the second drive electrodes.

3. The detecting device according to claim 1, further comprising:
   a detection circuit configured to receive output from the detection electrodes; and
   a detection electrode selection circuit configured to switch a coupling state between the detection electrodes and the detection circuit, wherein
   the detection electrode selection circuit causes the detection electrodes to be decoupled from the detection circuit in the second period.

4. The detecting device according to claim 1, wherein
   the drive electrodes extend in the second direction and each have a first end serving as one end in the extending direction on the same side, and
   the switch elements are coupled to a plurality of the first ends of the respective drive electrodes in the extending direction.

5. The detecting device according to claim 1, wherein
   the drive electrodes extend in the second direction, each have a first end serving as one end in the extending direction on the same side, and each have a second end serving as the other end on the other same side, and
   the switch elements are coupled to a plurality of the first ends and a plurality of the second ends of the respective drive electrodes in the extending direction.

6. The detecting device according to claim 1, wherein
   the drive electrodes extend in the second direction, each have a first end serving as one end in the extending direction on the same side, and each have a second end serving as the other end on the other same side, and
   the drive signal supply circuit supplies the drive signal to a plurality of the first ends and a plurality of the second ends of the respective drive electrodes in the extending direction.

7. The detecting device according to claim 6, wherein the drive electrodes are each divided into a part on the first end side and a part on the second end side by a slit formed at a center part.

8. The detecting device according to claim 1, having a normal detection mode to detect an object to be detected and an idling mode not to detect the object to be detected, wherein
   the switch elements and the drive signal supply circuit perform an operation in the first period and the second period in the normal detection mode and the idling mode.

9. The detecting device according to claim 1, having a normal detection mode to detect an object to be detected and an idling mode not to detect the object to be detected, wherein
   the switch elements and the drive signal supply circuit perform an operation in the first period and the second period in the idling mode, and
   the switch elements and the drive signal supply circuit do not perform an operation in the second period in the normal detection mode.

10. The detecting device according to claim 1, further comprising a cover member provided facing the drive electrodes and the detection electrodes.

11. The detecting device according to claim 10, wherein a decorative layer is provided on a periphery of the cover member.

12. A display device with a touch detection function, wherein a display device is attached to a back surface of the detecting device according to claim 1.

13. A detecting device comprising:
   a plurality of drive electrodes arrayed in a first direction;
   a plurality of detection electrodes arrayed in a second direction intersecting the first direction;
   a drive signal supply circuit configured to supply a drive signal to the drive electrodes; and
   a plurality of switch elements configured to switch between coupling and decoupling between the drive electrodes,
   wherein
   the drive electrodes include at least a first drive electrode and a second drive electrode disposed side by side in the first direction,
   the drive signal supply circuit supplies a first voltage signal to one of the first drive electrode and the second drive electrode and supplies a second voltage signal having an electric potential different from an electric potential of the first voltage signal to another one of the first drive electrode and the second drive electrode,
   the switch elements switch between coupling and decoupling of at least the first drive electrode and the second drive electrode,
   the drive electrodes supplied with the first voltage signal and the drive electrodes supplied with the second voltage signal are selected based on a predetermined code, the first voltage signal or the second voltage signal is supplied to the drive electrodes disposed in a partial region in a detection region, and the other drive electrodes are brought into a floating state or are coupled to a reference potential.

14. The detecting device according to claim 13, having a first period and a second period that differ in a coupling state of the switch elements, wherein in the first period,
the switch elements cause the first drive electrode to be decoupled from the second drive electrode, and
the drive signal supply circuit supplies the first voltage signal to at least one or more of a plurality of the first drive electrodes and supplies the second voltage signal to at least one or more of a plurality of the second drive electrodes, and in the second period,
the drive signal supply circuit stops supplying the first voltage signal to the first drive electrode and supplying the second voltage signal to the second drive electrode, and
the switch elements couple the first drive electrode and the second drive electrode.

15. The detecting device according to claim 14, further having a third period after the second period, wherein
in the third period,
the switch elements cause the first drive electrode to be decoupled from the second drive electrode, and
the drive signal supply circuit supplies the second voltage signal to at least one or more of the first drive electrodes and supplies the first voltage signal to at least one or more of the second drive electrodes.

16. The detecting device according to claim 14, further comprising:
a detection circuit configured to receive output from the detection electrodes; and
a detection electrode selection circuit configured to switch a coupling state between the detection electrodes and the detection circuit, wherein
the detection electrode selection circuit causes the detection electrodes to be decoupled from the detection circuit in the second period.

17. The detecting device according to 14, having a normal detection mode to detect an object to be detected and an idling mode not to detect the object to be detected, wherein
in the idling mode, the switch elements and the drive signal supply circuit perform an operation in the first period and an operation in the second period, and
in the normal detection mode, the switch elements and the drive signal supply circuit perform at least the operation in the first period.

18. The detecting device according to claim 13, wherein
the drive electrodes extend in the second direction and each have a first end serving as one end in the extending direction on the same side, and
the switch elements are coupled to a plurality of the first ends of the respective drive electrodes in the extending direction.

19. The detecting device according to claim 13, wherein
the drive electrodes extend in the second direction, each have a first end serving as one end in the extending direction on the same side, and each have a second end serving as the other end on the other same side, and
the switch elements are coupled to a plurality of the first ends and a plurality of the second ends of the respective drive electrodes in the extending direction.

20. The detecting device according to claim 13, wherein
the drive electrodes extend in the second direction, each have a first end serving as one end in the extending direction on the same side, and each have a second end serving as the other end on the other same side, and
the drive signal supply circuit supplies the drive signal to a plurality of the first ends and a plurality of the second ends of the respective drive electrodes in the extending direction.

* * * * *